United States Patent [19]

Sudau

[11] Patent Number: 5,678,672
[45] Date of Patent: Oct. 21, 1997

[54] TORQUE TRANSMISSION DEVICE, SUCH AS A CLUTCH

[75] Inventor: Jörg Sudau, Niederwerrn, Germany

[73] Assignee: Fichtel & Sachs AG, Schweinfurt, Germany

[21] Appl. No.: 568,267

[22] Filed: Dec. 6, 1995

[30] Foreign Application Priority Data

Dec. 7, 1994 [DE] Germany .................. 44 43 454.5

[51] Int. Cl.$^6$ .................................................. F16D 27/00
[52] U.S. Cl. .................. 192/84.1; 192/84.2; 192/84.3; 192/84.4
[58] Field of Search ..................... 192/84.1, 84.2, 192/84.3, 84.4

[56] References Cited

U.S. PATENT DOCUMENTS

| | | | |
|---|---|---|---|
| 3,240,306 | 3/1966 | Armstrong | 192/84.4 |
| 3,629,754 | 12/1971 | Sobottka et al. | |
| 4,460,076 | 7/1984 | Yamada | 192/84.2 X |

FOREIGN PATENT DOCUMENTS

| | | |
|---|---|---|
| 4010543 | 10/1991 | Germany . |
| 2013289 | 8/1979 | United Kingdom . |

Primary Examiner—Andrea L. Pitts
Attorney, Agent, or Firm—Nils H. Ljungman and Associates

[57] ABSTRACT

A torque transmission device (10) for the selective transmission of a torque between drive input parts (12) and drive output parts (14) which rotate relative to one another around an axis of rotation (A), comprising: a first clutch element (15) which is non-rotationally connected to the drive input part (12), a second clutch element (17) which is non-rotationally connected to the drive output part (14) and can be brought into selective torque transmission engagement with the first clutch element (15), whereby the first and/or the second clutch element (15, 17) comprises a membrane element (32, 36) which is in a membrane plane (E, E') which is oriented essentially orthogonally to the axis of rotation (A), displacement means (40, 42) corresponding to the respective membrane element (32, 36) for the generation of an axial displacement of the respective membrane element (32, 36) for the torque transmission engagement, whereby, in the displacement state, the respective membrane element (32, 36) comprises at least one axial displacement maximum in a circumferential direction of the respective membrane element (32, 36).

20 Claims, 6 Drawing Sheets

5,678,672

TORQUE TRANSMISSION DEVICE, SUCH AS A CLUTCH

BACKGROUND OF THE INVENTION

1. Field of the Invention

The present invention generally relates to a torque transmission device.

2. Background Information

There are known torque transmission devices in the form of clutches or similar devices in motor vehicles. The clutches are located, for example, in the transmission path between an engine and a gearbox of a motor vehicle, so that the engine can be decoupled from the gearbox as necessary, to shift gears. These known clutches essentially comprise two plates which each have friction linings which are pushed toward one another under the action of a multiplicity of compression springs or similar devices, hereby one of the plates is non-rotationally connected to an engine output shaft, and the other plate is non-rotationally connected to a transmission input shaft. The plates can be pulled apart against the action of the springs which apply a bias to neutralize the frictional engagement and thus to effect a rotational decoupling of the engine and the transmission.

One problem with these known clutches is that, on account of the frictional engagement between the two plates, in particular when the plates are brought into engagement with one another, i.e. when the motor vehicle is started or when the gears are shifted, these plates have some slip relative to one another. A great deal of heat is generated in the vicinity of the friction linings of the plates which rub against one another, and this heat can have a disadvantageous effect on the efficiency of the known clutches. Moreover, on account of the non-positive frictional connection between the two plates of such a clutch, the mechanism is very sensitive to contamination of the clutch plates, e.g. by oil or grease. Such clutches also experience a relatively high degree of wear. Since the input and output sides of this known clutch device create an essentially rigid connection between the drive input and drive output parts, in particular when the drive input and drive output parts are coupled to one another, there is generally no vibrational isolation of the input and output side, in particular when the clutch is engaged. In other words, vibrations generated in particular on the engine side of the clutch device can be transmitted essentially undamped to the transmission side, where they can generate rattling and chattering noises in the transmission.

To keep the vibrational excitation of individual components, e.g. of the transmission, as low as possible, torsional vibration dampers are frequently installed in the clutch, but such vibration dampers are expensive and also increase the weight and inertia of the mechanism.

OBJECT OF THE INVENTION

On the other hand, it is an object of the present invention to create a torque transmission device that is relatively lightweight and that operates without experiencing essentially any wear, and in which the components coupled by the torque transmission device can be vibrationally isolated from one another essentially completely.

SUMMARY OF THE INVENTION

The present invention teaches that the above object can be accomplished, in accordance with at least one preferred embodiment, by a torque transmission device for the selective transmission of a torque between the drive input parts and drive output parts which rotate relative to one another around an axis of rotation, the torque transmission device comprising:

- a first clutch element which is non-rotationally connected to the drive input part,
- a second clutch element which is non-rotationally connected to the drive output part and can be brought into selective torque transmission engagement with the first clutch element, whereby the first and/or the second clutch element comprises a membrane element which is oriented in a membrane plane which is oriented essentially orthogonally to the axis of rotation,
- displacement means corresponding to the respective membrane element for the generation of an axial displacement of the respective membrane element for the torque transmission engagement, whereby the respective membrane element, in the displacement state, comprises at least one axial displacement maximum in a circumferential direction of the respective membrane element.

On a torque transmission device contemplated by at least one preferred embodiment of the present invention, the clutch engagement between the two clutch elements is accomplished by membrane elements which are displaced from a respective membrane plane in the axial direction. When coupled to the respective other clutch element, the displacement maximum of one membrane element is therefore engaged to or with the other membrane element. The connection between the drive input and drive output parts is essentially not rigid, so that between these two parts, even when the clutch is engaged, essentially no vibrations, e.g. engine vibrations, etc., can be transmitted between them.

Since the coupling between the two clutch elements is maintained by the at least one axial displacement maximum (i.e. a positive engagement is maintained between the two clutch elements on a torque transmission device contemplated by the present invention), the coupled state is essentially not achieved by a non-positive, frictional engagement, which means that a torque transmission device contemplated by the present invention operates essentially without friction and thus essentially without wear.

A torque transmission device contemplated by the present invention can be manufactured particularly economically and simply if the first or the second clutch element comprises a membrane element, the respective other clutch element comprises a membrane application element, and the membrane element can be displaced by the displacement means in the displaced state such that the membrane element is applied against the membrane element in the vicinity of the at least one axial displacement maximum.

Therefore, only one membrane application element needs to be provided with the corresponding displacement means. The membrane application element can comprise an essentially rigid application plate or similar device, in which, e.g. on the side facing the membrane element, there is already some sort of structure in the axial direction which can then be brought into engagement with the at least one axial displacement maximum for the transmission of torque.

The membrane application element can advantageously comprise an elastically deformable application lining on the other clutch element. Therefore, if the membrane element is displaced by the respective displacement means, the at least one displacement maximum is applied against the elastically deformable application lining, and results in a deformation of the latter. Thus, in turn, in the vicinity of the displacement maximum there is a positive interlocking engagement between the membrane element and the elastically deformable application lining, whereby in the event of the transmission of torque, the elastic application lining, in the vicinity of its deformation, presses essentially in the circumferential direction against the flank of the at least one displacement maximum. Thus, in turn, the conventional frictional, non-positive connection between the clutch elements is eliminated, and consequently the torque transmission device contemplated by the present invention has a long useful life.

Alternatively, it is possible that the first clutch element comprises a first membrane element, and that the second clutch element comprises a second membrane element, whereby, in the displaced condition, the first and/or the second membrane element can be displaced by the respective corresponding displacement means toward the respective other membrane element. In this embodiment of the present invention, in the coupled state of the two clutch elements, the respective displacement maxima of the two membrane elements are engaged with one another in the axial direction, so that the torque to be transmitted between the two clutch elements is in turn transmitted by the flanks of the respective displacement maxima pressing against one another in the circumferential direction. In this embodiment, too, there is thus a positive and essentially non-wearing engagement between the two clutch elements by means of the respective membrane elements. In particular, on account of the use of the two membrane elements which are engaged with one another in the coupled state, in this embodiment of the invention, there is an essentially complete vibrational isolation between the drive input side and the drive output side of the torque transmission device.

The respective displacement means can comprise at least one piezoelectric membrane deflector. The use of a piezoelectric membrane deflector permits an essentially unpowered displacement of the respective membrane element out of the corresponding membrane plane.

Alternatively, the respective displacement means can comprise at least one electromagnetic membrane deflector. With an electromagnetic membrane deflector, essentially no direct contact with the respective membrane element is necessary. That results, on one hand, in an improved vibrational isolation of the two clutch elements, since essentially no vibrations can be transmitted by the respective displacement means, either. On the other hand, this embodiment permits a particularly simple construction of a torque transmission device contemplated by the present invention.

The at least one electromagnetic membrane deflector can advantageously comprise at least one first electrical coil which is separate from the membrane, as well as an interaction element which is provided on the membrane element which corresponds to the first electrical coil.

The interaction element can comprise a second electrical coil. This coil is then fastened to the membrane element, and by means of a suitable selection of the currents flowing through the first and second electrical coils, a repulsive or attractive interaction can be generated between the interaction element and the first electrical coil. It is thereby possible, by means of the selection of the magnitude of the currents flowing through the coils, to adjust a range of interaction, and thus to adjust the displacement of the respective membrane elements easily and within a broad range.

Alternatively, it is possible that the interaction element can comprise an interaction part which is made of magnetizable or permanent magnet material or made of the membrane element itself. In this embodiment of the interaction element, no current feeds need to be provided to any coils which may be present on the membrane element, which guarantees a simple construction of a torque transmission device contemplated by the present invention.

If the at least one membrane deflector on the respective clutch element is located in the vicinity of the axis of rotation, the at least one membrane deflector can act on the respective membrane element in an optimal and thus energetically more efficient manner.

Alternatively, it is possible for the at least one membrane deflector to be offset radially outward from the axis of rotation.

If a multiplicity of membrane deflectors have thereby been provided in the circumferential direction around the axis of rotation, it is essentially guaranteed that there can be a number of displacement maxima corresponding to the number of membrane deflectors, which means that an increased stability of the positive engagement between the two clutch elements can be guaranteed. In this embodiment of a torque transmission device an additional range of applications becomes available. As a result of the location of the membrane deflectors in the circumferential direction around the axis of rotation, it is possible, by alternately exciting and de-exciting the membrane deflectors with a chronological offset from one another, to form at least one displacement maximum which travels around the respective membrane element in the circumferential direction. The velocity at which the at least one displacement maximum travels around the membrane element, i.e. over the surface of the membrane element, can be arbitrarily selected within a wide range of velocities. But if such a displacement of the membrane element travelling in the circumferential direction is generated on one of the clutch elements, and a stationary displacement maximum with respect to the respective membrane element or clutch element is generated on the other clutch element, this stationary displacement maximum, if it becomes engaged with the travelling displacement maximum, is carried along in the circumferential direction. It is therefore possible, by the selective actuation or excitation of the displacement means, to generate a torque which can be transmitted from one of the membrane elements to the respective other membrane element. A torque transmission device contemplated by the present invention can therefore also be used as a torque generation device. On account of the presence of a torque transmission device contemplated by the present invention, it thus becomes essentially unnecsssary to use a starter, e.g. in motor vehicles which are powered by an internal combustion engine. It is also possible to use a torque transmission device contemplated by the present invention as a propulsion device.

It is also possible, by means of the controlled travel of the at least one displacement maximum, e.g. during the shifting procedure in a motor vehicle, to achieve a smooth synchronization of the speeds of rotation of the input and output parts of a torque transmission devise contemplated by the present invention. For this purpose, for example, the at least one displacement maximum on the drive input part can be allowed to travel in the circumferential direction at a corresponding velocity with respect to the drive input part, so that as a result of the superimposition of the speed of rotation of the drive input part and the speed of rotation of the at least one displacement maximum with respect to the drive input part, the result is a total speed of rotation of the at least one displacement maximum which essentially equals the speed of rotation of the at least one displacement maximum on the drive output part. Consequently, the speed of rotation of the at least one displacement maximum of the membrane element on the drive input part with respect to the drive output part can slowly be reduced to zero, to thereby synchronize the drive input part and the drive output part of a torque transmission device as contemplated by the present invention.

The at least one membrane deflector can be fastened to a membrane carrier of the respective clutch element. The at least one membrane deflector thus would essentially always rotate with the respective membrane element, and, in a simple manner, always generate a displacement of the respective membrane element, the position of which is defined in terms of the respective clutch element.

Alternatively, it is possible that the at least one membrane deflector can be located on a membrane deflector carrier which is rotationally decoupled or uncoupled from the corresponding clutch element. In such a configuration, the at least one membrane deflector can be located, for example, on a housing of the torque transmission device, and does not rotate along with the respective clutch element. Therefore, essentially no electrical sliding contacts or similar devices are necessary to supply electrical energy to the at least one deflector.

To provide the displacement means for the respective membrane elements, it is possible for the displacement means corresponding to the respective membrane elements to comprise the respective other membrane element or the membrane application element. In this case, essentially no additional displacement means separate from the membrane elements need be provided, which on one hand keeps the overall size of a torque transmission device contemplated by the present invention small, and on the other hand keeps the manufacturing costs of the torque transmission device low.

For that purpose, it is possible that the membrane element or membrane application element which forms the respective displacement means can comprise at least one area located in the circumferential direction which has a modifiable electrostatic charge and/or magnetic polarization, for electrostatic and/or magnetic interaction with the other membrane element, at least in certain areas. As a result of the electrostatic charging or magnetic polarization of areas of the respective membrane elements, an interaction force with the respective other membrane element can be generated, which, for example in an interaction which is like the interaction which occurs between the individual plates of a capacitor, displaces the at least one segment of the respective membrane element opposite a particular area in the axial direction, and thus generates the displacement necessary for the engagement of the membrane elements in the circumferential direction. It is thereby advantageous if there are a multiplicity of such areas. It is thus possible to generate a multiplicity of axial displacements on the respective membrane elements, and thus to guarantee a firm engagement between the respective membrane elements or between the membrane element and the membrane application element. Areas which follow one another in the circumferential direction are thereby charged or polarized opposite to one another.

An interaction between the respective membrane elements or the membrane element and the membrane application element which is essentially continuous in the circumferential direction can be achieved if the areas essentially comprise the entire circumference of the respective membrane element or membrane application element.

The respective application means can comprise at least one vibration generator to generate an axial vibration of the respective membrane element, whereby the displacement state of the respective membrane element is a vibration state.

As a result of the use of a single vibration generator, for example, it thereby becomes possible to generate a vibration state of the respective membrane element which comprises a multiplicity of displacement maxima, as a result of which, in turn, the strength of the positive engagement can be increased.

To keep the excitation energy for the respective membrane element as low as possible, the invention teaches that the respective membrane element can be excited by the at least one vibration generator in at least one natural vibration state.

Preferably, the at least one natural vibration state can be a standing wave, and a natural vibration shape of the first or second membrane element is preferably a whole-number multiple of a natural vibration shape of the respective other element. By means of this special number of the respective displacement maxima on the respective membrane elements, it is possible to achieve an optimal engagement of the membrane elements in the vicinity of their displacement maxima. At the same time, on account of this ratio between the number of maxima of the two membrane elements, the membrane with the energetically stronger vibration excitation is prevented from transmitting energy to the membrane with the energetically weaker excitation, and thereby possibly generating a vibration excitation of the entire torque transmission device, and/or adversely affecting the positive interlocking engagement of the displacement maxima of the membrane elements.

To be able to provide the above-mentioned functions of torque generation and/or speed synchronization, including when the displacement maxima are being generated by vibrational excitation of the respective membrane elements, the present invention teaches that the first and/or the second membrane element can have a multiplicity of separate membrane sector elements located one after another in the circumferential direction, and that there is a vibration generator corresponding to each membrane sector element. The respective membrane element therefore can comprise a multiplicity of separate sector elements which are essentially vibrationally isolated from one another, which can then be excited to vibrate independently of one another by means of the vibration generators corresponding to these sector elements. By means of the appropriate excitation of the individual vibration generators, i.e. a vibration phase angle of the vibration generators which have been tuned to one another, and thus of the individual membrane sector elements which have been tuned to one another, it is thereby possible to generate a wave which travels over the membrane element in the circumferential direction. By means of this travelling wave, a displacement maximum of the respective other element, e.g. a standing wave or a static displacement, can in turn be carried along with it, and thus a torque can be generated, or the speed of rotation of the two clutch elements can be synchronized with one another.

Even with the above mentioned use of the respective membrane elements themselves as the displacement means, for example by means of an electrostatic charge of the membrane element, with a corresponding electrostatic interaction between the individual membrane elements, it is possible to place the respective membrane element in a vibrating state. For that purpose, essentially all that is necessary is to change the respective electrostatic charge or magnetic polarization of the membrane element in the manner which corresponds to the desired vibration shape of the respective membrane element, thereby generating an electric charge or magnetic polarization of the at least one area which changes periodically over time.

A particularly stable construction of the clutch elements with the respective membrane elements can be achieved if the membrane element is non-rotationally connected in the vicinity of its outside circumferential edge with a membrane carrier of the clutch element.

Alternatively, it is possible that the respective membrane element, in the vicinity of the axis of rotation with a radially inner segment of the membrane element, can be non-rotationally connected with a membrane carrier of the respective clutch element.

A lock-up clutch device can also be provided for the rigid torque-transmission coupling of the first and second clutch elements. The lock-up clutch device can be engaged, for example, when the drive input and drive output part are rotating at the same speeds, and when, for example, a motor vehicle is travelling at a constant speed. This lock-up clutch makes possible a more energy-saving operation of the entire motor vehicle, since, on one hand, essentially no energy is required for the displacement of the membrane elements, and, on the other hand, any slip which may occur in the torque transmission device is eliminated.

The present invention may also relate to the use of a torque transmission device contemplated by the present invention as a clutch device, in particular in a motor vehicle.

The present invention may also relate to a clutch device.

The present invention may also relate to a starter device in a motor vehicle with an internal combustion engine.

The present invention may also relate to the use of the starter device as a clutch device in a motor vehicle with an internal combustion engine.

The present invention may also relate to a torque transmission device with active vibration isolation, in particular for a motor vehicle which is powered by an internal combustion engine, comprising a torque transmission device which has first and second membrane elements to generate the torque transmission engagement, displacement means for the generation of at least one axial displacement of the first membrane element and/or of the second membrane element respectively, means for the detection of the vibrational excitation of the drive input part and/or of the drive output part, as well as means to control the at least one displacement of the first and/or second membrane element, such that the vibrational excitation of the drive input part and/or of the drive output part is not transmitted to the respective other part. As a result of the detection of the vibrational excitation of the respective components of the torque transmission device, and then the control of the membrane elements which are engaged with one another such that the vibrational excitation of the drive input part and or the drive output part is not transmitted to the respective other side, it is possible to prevent the transmission of vibrations by the torque transmission device, even with severe vibration excitation states of the drive input and output parts.

The displacement means on the first and/or second membrane element thereby preferably each generate at least one displacement which travels in a circle in the circumferential direction, and the means to control the deflection preferably comprise means for the generation of a deflection maximum of the first and/or second membrane element which oscillates or varies in the circumferential direction with respect to a stationary coordinate system, whereby the speed of rotation of the at least one displacement maximum of the first membrane element essentially equals the speed of rotation of the at least one displacement maximum of the second membrane element. As a result of the oscillation or variation of the displacement maximum in the circumferential direction, vibrations of the drive input and output parts, e.g. torsional vibrations of these parts, can be prevented.

It is also possible that the means to control the at least one displacement maximum of the first and/or of the second membrane elements comprise means to vary the amplitude of the at least one displacement maximum of the first and/or second membrane element. By changing the amplitude of the at least one displacement maximum, vibrations of the drive input and output parts in a longitudinal direction of these parts can be compensated, so that in turn, the transmission of such vibrations to the respective other side can be prevented.

The present invention may also relate to a propulsion device, in particular for a motor vehicle.

BRIEF DESCRIPTION OF THE DRAWINGS

The present invention is explained in greater detail below, with reference to the embodiments illustrated in the accompanying drawings.

FIG. 1a is a detail of FIG. 1 on an enlarged scale, when a torque transmission device as contemplated by the present invention is in the coupled state;

DESCRIPTION OF THE PREFERRED EMBODIMENTS

Figure 1:
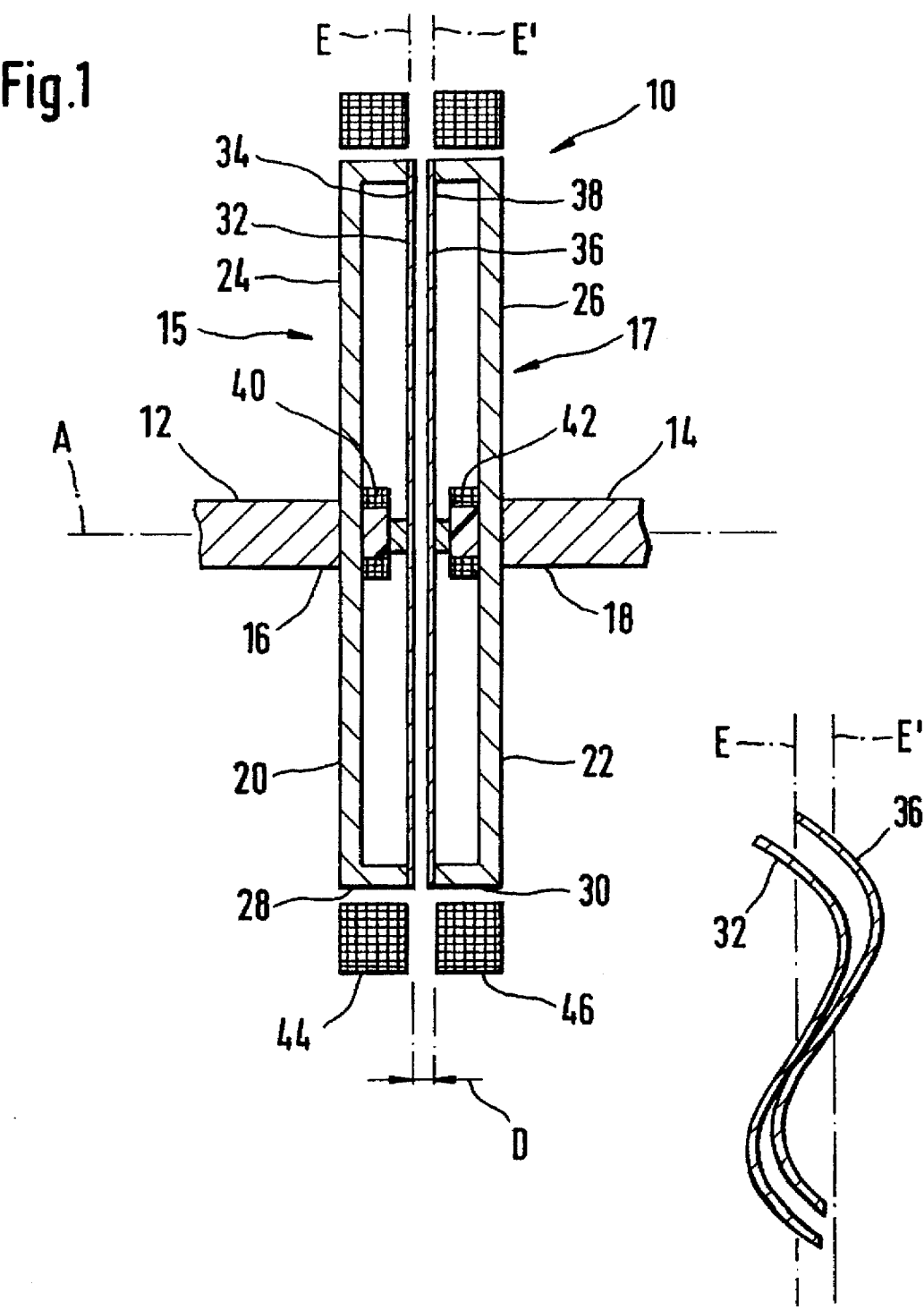
FIG. 1 shows a view in longitudinal section of a first embodiment of a torque transmission device as contemplated by the present invention.

FIG. 1 shows a torque transmission device as contemplated by the present invention, the torque transmission device being indicated at 10 in general. The torque transmission device 10 comprises a drive input part 12 which is installed and fastened so that it can rotate around an axis of rotation A. The drive input part 12 can be connected, for example, to the output shaft of an engine. The torque transmission device 10 also comprises a drive output part 14, which is also oriented rotationally around the axis of rotation A. The drive output part 14 can be firmly connected, for example, to a transmission input shaft of a motor vehicle transmission (not shown). The drive input part 12 and the drive output part 14 each support, in the vicinity of their ends 16, 18 facing one another, a first and second clutch element 15, 17 respectively, each of which has a respective membrane carrier 20 and 22. The first membrane carrier 20 is non-rotationally connected to the drive input part 12, and the second membrane carrier 22 is non-rotationally connected to the drive output part 14. The first and second membrane carriers 20, 22 are essentially constructed in the manner of shells, cups or saucers, with a base segment 24 and 26 respectively, and respective peripheral segments 28 and 30.

A first membrane element 32 is fastened to the peripheral segment 28 of the first membrane carrier 20 in the vicinity of its outer circumferential edge 34, and a membrane element 36 is fastened to the peripheral segment 30 of the second membrane carrier 22 in the vicinity of its outer circumferential edge 38.

In addition, in a central segment of either the first membrane carrier 20 or the second membrane carrier 22, displacement means 40 or 42 are fastened either to the first membrane carrier 20 or the second membrane carrier 22. In the embodiment illustrated in FIG. 1, the displacement mean, 40, 42 comprise piezoelectric vibration generators 40, 42, these being firmly coupled, respectively, to the first membrane element 32 and to the second membrane element 36. By means of the piezoelectric vibration generators 40, 42, the first membrane element 32 and the second membrane element 36 can each be excited to vibrate in a manner described below, and can thus be displaced from their respective membrane planes E, E' (these planes being essentially orthogonal to the axis of rotation A and to the plane of the drawing in FIG. 1), toward the axis of rotation A.

Figure 4:
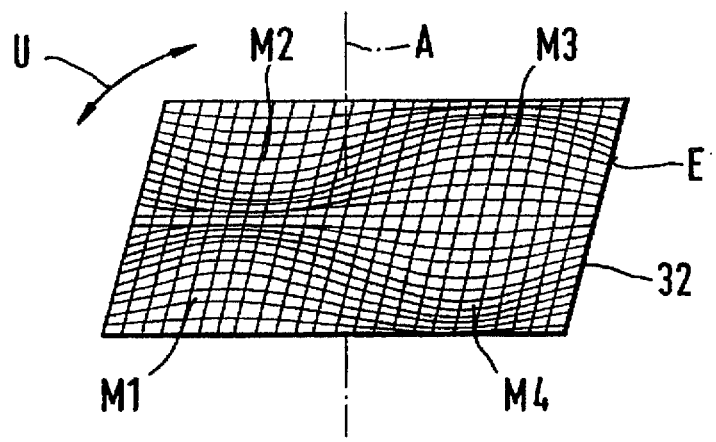
FIG. 4 is a view in perspective of a central segment of a membrane element in a displaced state of the membrane element.

FIG. 4 is a view in perspective of such a vibration state of a central segment of the membrane element 32. By selecting the excitation frequency of the piezo-electric vibration generators 40, 42, it is possible to excite the respective membrane elements 32, 36 in a natural vibration state. That means that relatively large displacements of the respective membrane elements can be achieved by applying the least possible excitation energy. As shown in FIG. 4, the membrane element 32 is excited into a vibration state in which there are four displacement maxima M1, M2, M3 and M4 one after another in the circumferential direction U. The expression "displacement maximum" is here defined as a respective maximum displacement of the membrane element out of the membrane plane, regardless of the orientation of the displacement along the axis of rotation A. In the vibration state illustrated in FIG. 4, therefore, the displacement maxima M1 and M3 in the illustration are displacement maxima oriented upward, i.e. wave crests in the drawing, and the displacement maxima M2 and M4 are displacement maxima oriented downward, i.e. wave valleys.

If the torque transmission device 10 illustrated in FIG. 1 is then to be used to transmit a torque from the drive input part 12 to the drive output part 14, the respective vibration generators 40, 42 cause the membrane elements 32, 36 to go into a vibrating state, whereby then, for example, the pattern of vibrations of the membrane elements 32, 34 illustrated in FIG. 4 is built up. Since, in the case of a differential torque which is to be transmitted between the drive input part 12 and the drive output part 14 at the beginning of the engagement of the two membrane elements 32, 36, the two membrane elements are rotating relative to one another, during this relative rotation, for example, the wave crests of the membrane element 32 come to lie in the wave valleys of the membrane element 36 (See FIG. 1a). Thus, the two membrane elements are in contact with one another in the vicinity of the flanks, or sides, of their maxima, so that, as a result of the more rapid rotation of the membrane element 32, for example, a torque in the circumferential direction U is transmitted by the flank segments of the respective displacement maxima of membrane element 32 and membrane element 36, these flank segments being in contact with one another, to the second membrane element 36 and thus to the drive output part 14. The displacement of the respective membrane elements 32, 36, in the vicinity of the respective displacement maxima and out of the respective membrane planes E, E', is thereby preferably greater than the distance D between the membrane plane E of the first membrane element 32 and the membrane plane E' of the second membrane element 36. In the coupled state of a torque transmission device contemplated by the present invention, in which the first membrane element 32 and the second membrane element 36 are in torque-transmitting engagement, there is a positive, interlocking engagement of the two membrane elements 32, 36. The transmission of the torque therefore takes place without frictional engagement, so that the torque can be transmitted essentially without the generation of frictional heat, and the respective clutch elements on the drive input part 12 and on the drive output part 14 are essentially subject to no wear The vibrational states of the first membrane 32 and of the second membrane element 36, respectively, including those generated by excitation by means of the piezoelectric vibration generators 40, 42, are preferably selected so that the vibration shape (e.g. the vibration frequency of the first membrane element 32 or of the second membrane element 36) is a whole-number multiple of the respective other membrane element. A whole-number multiple in this case is defined as once, twice, three times, etc., the vibration shape of the respective membrane element. In this case, it can essentially be guaranteed that all the displacement maxima of the membrane element having the smaller vibration shape can be brought into an interlocking engagement with displacement maxima of the other membrane element, which means that a very strong positive, interlocking coupling of the two membrane elements can be achieved. The strength of the positive, interlocking engagement of the membrane elements, and thus the magnitude of the maximum torque which can be transmitted, is thereby limited only by the strength of the material or the amount of the displacement of the respective membrane elements. Moreover, in a torque transmission device contemplated by the present invention, energy from the membrane element which has the higher vibration energy is prevented from being transmitted to the membrane element which has the lower vibration energy.

Because, in a torque transmission device contemplated by the present invention, there are components that are not rigidly coupled to one another even when the clutch is engaged, it is possible to prevent vibrations generated on the drive input side (for example, e.g. engine vibrations) from being transmitted, via potentially rigidly coupled components, to the drive output side (e.g. to the transmission side and thus to the body of the vehicle).

If it is desirable to decouple the drive output part 14 from the drive input part 12, then only the vibration generators 40, 42 are de-excited, and the vibration states of the first membrane element 32 and of the second membrane element 36 are ended, or the amplitudes or phase angles of the displacement maxima can be changed. The membrane elements 32, 36 then once again each lie in their membrane planes E, E', without displacement toward the axis of rotation A, and are not engaged with one another. The drive input part 12 and the drive output part 14 can thus once again rotate freely or independently with respect to one another.

The piezoelectric vibration generators 40, 42 can be supplied with electrical energy by electrical feeds (not shown) provided on the drive input part 12 and on the drive output part 14, and by means of conventional sliding contacts (not shown in the figure).

If a torque transmission device contemplated by the present invention is used in a motor vehicle which is powered by an internal combustion engine, one problem, for example, is that in the event of a power failure in the motor vehicle, the vehicle must be pushed or towed, and the torque must thereby be transmitted from the drive output side, i.e. the transmission side, via the drive output part 14 to the drive input side, i.e. to the internal combustion engine (not shown in the figure) or to the drive input part 12. But since, on account of the lack of power in the vehicle, there is no electrical energy available to supply the vibration generators 40, 42, FIG. 1 illustrates one possibility of generating electrical energy by means of the torque transmission device 10 itself, and by pushing the vehicle. For that purpose, in the vicinity of the peripheral segment 28 and 30 of the first membrane carrier 20 and of the second membrane carrier 22 respectively, there is a first induction coil 44 which surrounds the first membrane carrier 20, and a second induction coil 46 which surrounds the second membrane carrier 22. If the vehicle is pushed when in gear, the forced rotation of the wheels of the vehicle is transmitted via the gearbox to the drive output part 14, so that the second membrane carrier 20 also rotates. The latter then acts as an exciter rotor and, in the manner of a generator, induces an electric current by means of its rotation in the second induction coil 46. The electric current generated in the second induction coil 46 also generates an electric current in the first induction coil 44 located next to the second induction coil 46, in the manner of a transformer. The electric currents generated in this manner can be used to excite the piezoelectric vibration generators 40, 42 and to excite the first membrane element 32 and the second membrane element 46 to vibrate, and thus to be displaced from the respective membrane planes E, E'. Using a torque transmission device contemplated by the present invention, the torque can therefore be transmitted during pushing or towing of a motor vehicle essentially without an external energy source. The torque transmission device can also thereby be used as a generator, or dynamo.

It is also possible to use the first and/or second induction coils 44, 46 directly as a starter for the motor vehicle. An electric current flowing in the first or second induction coil 44, 46, respectively, thereby generates a magnetic field which can then be used, e.g. with the permanent magnet interaction segments provided in the vicinity of the respective peripheral segments 28 and 30 of the respective membrane carriers 20 and 22, to generate a rotation of the respective membrane carriers 20 and 22.

Figure 2:
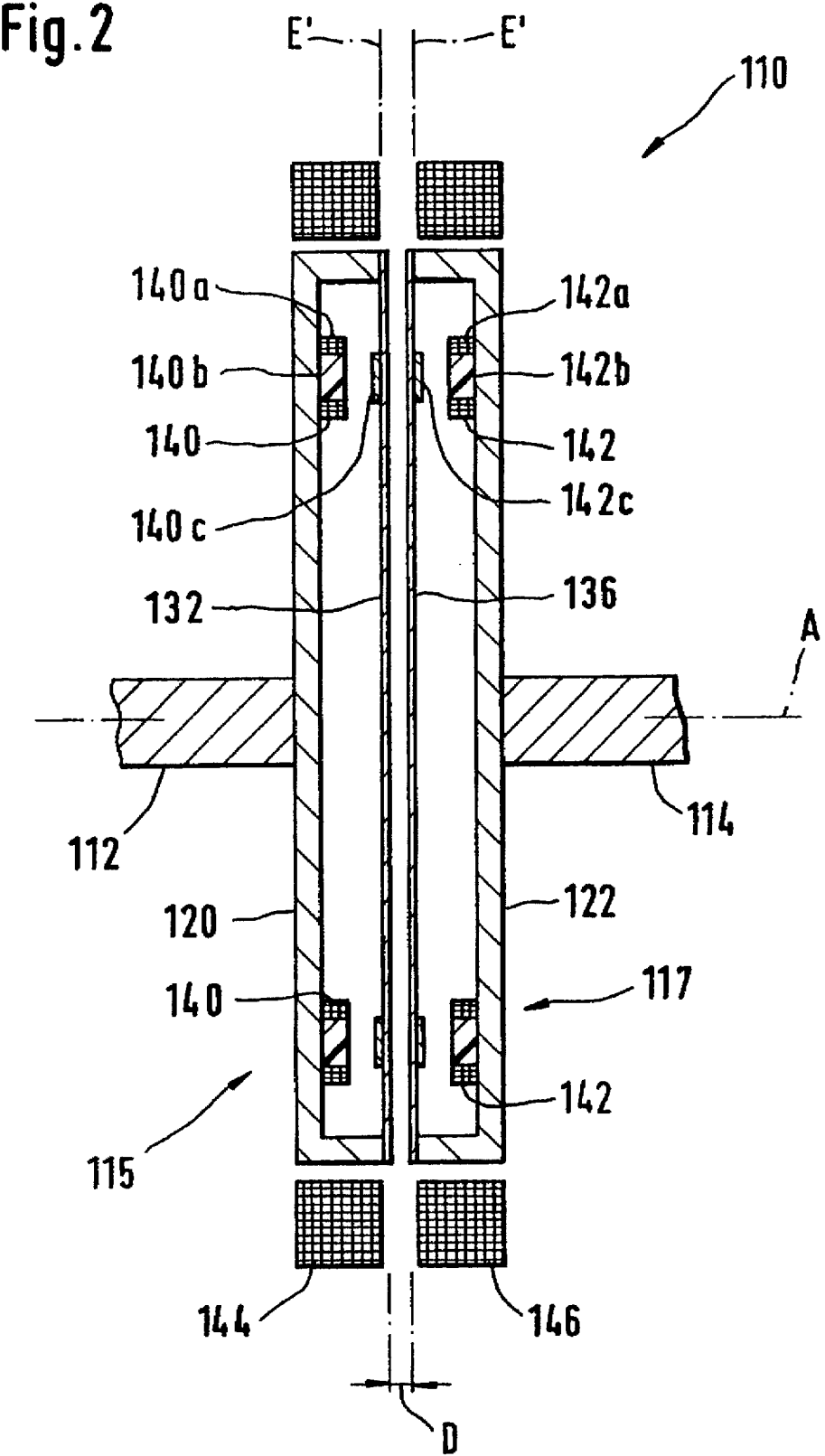
FIG. 2 is a longitudinal section through a second embodiment of a torque transmission device contemplated by the present invention.

FIG. 2 illustrates a second embodiment of a torque transmission device contemplated by the present invention. Elements which correspond to the elements illustrated in FIG. 1 are identified by the same reference numbers plus 100.

The construction of the torque transmission device 110 is essentially the same as the construction of the device illustrated in FIG. 1, but in place of the essentially centrally located displacement means, on the torque transmission device 110, there are displacement means 140 and 142 which are offset radially outward on the first membrane carrier 120 and on the second membrane carrier 122 respectively. As shown in FIG. 2, both on the first membrane carrier 120 and on the second membrane carrier 122, there are a multiplicity of displacement means 140 and 142 respectively, located one after another in the circumferential direction. The displacement means 140, 142 illustrated in FIG. 2 each comprise a first electrical coil 140a and 142a respectively, which are each wound around a respective core 140b and 142b.

The displacement means 140 and 142 also respectively comprise an interaction element 140c and 142c fastened to the first membrane element 132 and to the second membrane element 136 respectively. The interaction elements 140c and 142c can, for example, each be embodied by a second electrical coil or can also be embodied by interaction part made of permanent magnet or magnetizable material. By exciting the first electrical coil 140a and 142a, a respective magnetic field is generated which, by interaction with the respective interaction element 140c and 142c, generates a force component directed toward the axis A, by means of which the first membrane element 132 and the second membrane element 136 are displaced toward the axis A. The operation of the torque transmission device 110 of the second embodiment is therefore essentially the same as the operation of the torque transmission device 10 of the first embodiment. Therefore, as in the first embodiment, there is a positive, interlocking engagement between the displacement maxima of the respective membrane elements 132, 136 which follow one another in the circumferential direction, by means of which a torque can in turn be transmitted from the drive input part 112 to the drive output part 114. If the torque transmission engagement between the displacement maxima of the first membrane element 132 and the displacement maxima of the second membrane element 136 is eliminated, only the respective electrical coils 140a and 142a of the displacement means 140 and 142 are de-excited. The first membrane element 132 and the second membrane element 136 then return to their respective membrane planes E, E', so that the drive input part 112 and the drive output part 114 can rotate freely with respect to one another.

In this embodiment of the invention, the displacement of the first membrane element 132 and of the second membrane element 136, caused respectively by the displacement means 140 and 142, can also comprise a vibration displacement or vibration excitation of the first membrane element 132 end of the second membrane element 136 respectively. In this case, only the respective coils 140a, 142a need to be excited with an alternating current, as a result of which an alternating repulsive and attractive interaction is caused between the magnetic fields generated by the coil 140a and 142a and the interaction element 140c, 142c. In this embodiment, it is also advantageous if the respective membrane elements 132, 136 are excited in natural vibration states.

But in this embodiment of the invention, it is also possible, by means of the displacement means 140 and 142 located one after another on the first membrane carrier 120 and on the second membrane carrier 122 respectively, to generate a respective static displacement of the first membrane element 132 and of the second membrane element 136. In this case, only the electrical coils 140a and 142a of the respective displacement means 140 and 142 are excited with a direct current. This direct current generates a magnetic field which, by interaction with the respective interaction elements 140c and 142c, leads to a static attraction or repulsion, and thus to a static displacement of the first membrane part 132 and second membrane part 136 respectively.

When a static displacement of the membrane elements 132, 136 is used, or made use of, it is possible to use a torque transmission device 110 contemplated by the present invention to generate a torque itself and to use a torque transmission device contemplated by the present invention as a starter, for example, or as a propulsion unit for a motor vehicle. Such a use of a torque transmission device contemplated by the present invention as a starter for a motor vehicle is described below, although it is clear that the use of a torque transmission device contemplated by the present invention as a torque generating device is not limited to its use as a starter for a motor vehicle engine.

To start an internal combustion engine which is non-detachably connected to the drive input part 112, first a rotation of the drive output part 114 can be prevented, e.g. by putting the transmission (not shown) into gear. Then, via excitation of the coils 140a and 142a and via the attractive or repulsive force thereby generated on the interaction elements 140c and 142c, it becomes possible to generate a displacement of the first membrane element 132 and of the second membrane element 136 respectively, so that they are once again engaged with one another in the vicinity of their displacement maxima, and to provide a positive, interlocking coupling. Then, the electric coils 140a and/or the electric coils 142a, corresponding to the respective deflection means 140 and 142 which are located one after the other in the circumferential direction, are supplied with electric currents, so that a deflection of the first membrane element 132 and/or of the second membrane element 136 is produced, whereby this deflection moves in the circumferential direction around the axis of rotation A. This movement can be brought about, for example, by a brief, successive reduction of the excitation current of each of the electric coils of the displacement means 140 and 142, which are located one after the other in the circumferential direction. As a result of the displacement or deflection on one of the membrane elements which moves in a circle in the circumferential direction, the displacement on the other membrane element which is engaged in this displacement is also driven so that it moves in a circle in the circumferential direction, and thus places the membrane carrier connected to this membrane element in rotation.

For this purpose, as mentioned above, the displacement of one of the membrane elements can be kept stationary with respect to the respective membrane carrier, and only the deflection on the respective other membrane element can be allowed to travel in the circumferential direction with respect to the other membrane carrier. But it is also possible to provide a displacement which moves in the circumferential direction on each of the two membrane elements, to thereby generate a torque by means of the superimposition of the two speeds of rotation of the respective displacement maxima. In this embodiment of the invention, it is therefore not necessary to provide a starter on a motor vehicle equipped with a torque transmission device contemplated by the present invention.

In the embodiment of the invention illustrated in FIG. 2, it is also possible to achieve a smooth engagement of the torque transmission device 110, in particular if there is a relatively large difference in speeds of rotation between the drive input part 112 and the drive output part 114. For this purpose, at the beginning of the clutch engagement procedure, i.e. at the beginning of the displacement of the first membrane element 132 and of the second membrane element 136, a displacement is generated, e.g. on the first membrane element 132, which travels in the circumferential direction, while on the second membrane element 136, a displacement is generated which is stationary with respect to the drive output part 114. The speed of rotation of the displacement of the first membrane element 132 with respect to that of the drive input part 112 is thereby selected so that the speed of rotation of the displacement of the first membrane element 132, which is formed by the superimposition of the speed of rotation of the drive input part 112 and the speed of rotation of the displacement of the first membrane part 132 with respect to that of the drive input part 112, essentially equals the speed of rotation of the displacement of the second membrane element 136. Therefore, at the beginning of the clutch engagement, no torque is initially transmitted from the drive input part 112 to the drive output part 114 or vice-versa. Subsequently, however, the speed of rotation of the displacement of the first membrane element 132 with respect to that of the drive input part 112 is gradually reduced to zero, so that the displacement of the first membrane part 132 is static with respect to the drive input part 112, and thus there is a gradual synchronization of the speed of rotation between the drive input part 112 and the drive output part 114. For this purpose, it is also possible, instead of the displacement of the first membrane element 132, to allow the displacement of the second membrane element 136 to initially travel in the circumferential direction with respect to the drive output part 114, and to gradually reduce this speed of rotation with respect to the drive output part 114 to zero. It is also possible to allow both the displacement of the first membrane element 132 and also the displacement of the second membrane element 136 to move in a circle with respect to the drive input part 112 and the drive output part 114, and thus to achieve a gradual synchronization of the speeds of rotation of the drive input part 112 and drive output part 114.

In this embodiment of the invention, it is also possible to generate a current by electromagnetic induction, for example in the event of a power failure in a motor vehicle, by pushing the motor vehicle, because of the presence of the first induction coil 144 or the second induction coil 146. The displacement means 140 and 142 can thereby be supplied with electric current, and even in the event of a power failure in the vehicle, they are thus able to displace the membrane elements 132 and 136 to establish the engagement which transmits the torque.

Such a control system for the displacement maxima of the membrane elements can also be used for an active vibrational isolation of a torque transmission device contemplated by the present invention. But for this purpose, it is also desirable to provide vibration excitation means (not shown in the figure) for the drive input side and for the drive output side. These drive input means can include, for example, means to measure the vibrational excitation of the drive input part and of the drive output part. On the basis of the vibrational excitation detected, the displacement maxima can then be controlled so that they neutralize the vibrations of the drive input and drive output parts. If, for example, there is a torsional vibration excitation of the drive input and drive output parts, it is possible to control the displacement maxima by means of a vibration in the circumferential direction, so that the torsional vibrations are absorbed. And it is also possible, in the event of axial vibration excitations, to absorb such vibrations, for example by modifying the amplitude of the displacement maxima, and thus to prevent a transmission of these vibrations to the respective other side.

Figure 3:
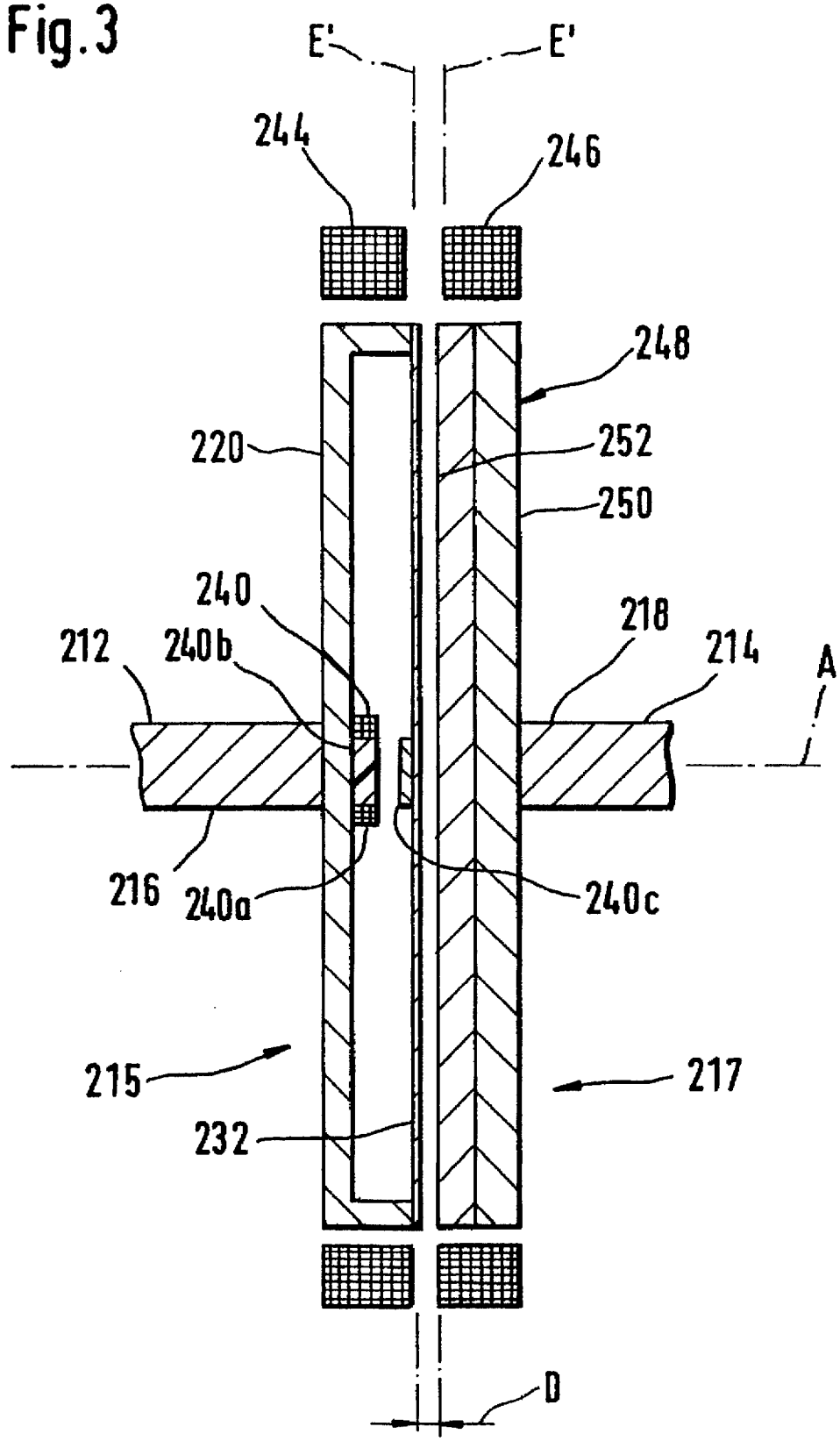
FIG. 3 is a longitudinal section through a third embodiment of a torque transmission device contemplated by the present invention.

FIG. 3 illustrates a third embodiment of a torque transmission device contemplated by the present invention. Elements which correspond to elements of the embodiment illustrated in FIG. 1 are identified by the same reference numbers plus 200. The drive input part 212 is again connected in the vicinity of its end 216 with the membrane carrier 220, which is described above with reference to the preceding embodiments. The membrane carrier 220 again supports a membrane 232. The membrane 232 can be displaced out of the membrane plane E toward the axis of rotation A by a displacement means 240 which is fastened to the membrane carrier 220 in the vicinity of the axis of rotation A.

The displacement means 240 can again comprise an electric coil 240a which is wound around a core 240b. On the membrane element 232, there is once again an interaction element 240c. The interaction element 240c can again be a second electric coil or an interaction part made of permanent magnet or magnetizable material. By exciting the electric coils 240a and possibly the electric coil of the interaction element 240c, the membrane element 232 can be displaced out of the membrane plane E.

Alternatively, however, it is possible, in the embodiment of the invention illustrated in FIG. 3, to provide the piezoelectric displacement means illustrated in FIG. 1, or to provide displacement means on the membrane carrier 220 which are offset toward the radial outside.

In the embodiment illustrated in FIG. 3, however, there is no corresponding membrane element on the drive output part 214. Instead, there is a membrane application element 248 on the drive output part 214 in the vicinity of its end 218. The membrane application element 248 comprises an essentially rigid plate 250 which has an elastically deformable membrane application lining 252. The membrane application lining 252 is thereby located opposite the membrane element 232.

For the transmission of a torque, e.g. from the drive input part 212 to the drive output part 214, the membrane element 232 is displaced in the axial direction by the displacement means 240, e.g. it is statically displaced or displaced by vibrational excitation toward the membrane application lining 252, so that its axial displacement is greater than the axial distance D between the membrane plane E and the end surface of the membrane application lining 252 which lies in the plane E'. The displacement maximum or the displacement maxima of the membrane element 232 can thereby be pressed into the membrane application lining 252, and deform it elastically. In other words, the membrane application lining 252 thereby adapts to the shape of the membrane element 232 in the vicinity of the displacement maxima of the membrane element 232. Thus, in the embodiment illustrated in FIG. 3, as in the preceding embodiments, for the torque coupling of the drive input part 212 to the drive output part 214, there is a positive, interlocking engagement of the membrane element 232 with the membrane application lining 252. The torque transmission therefore takes place without any frictional engagement, and without the related disadvantages of the amount of heat and wear generated.

Figure 5:
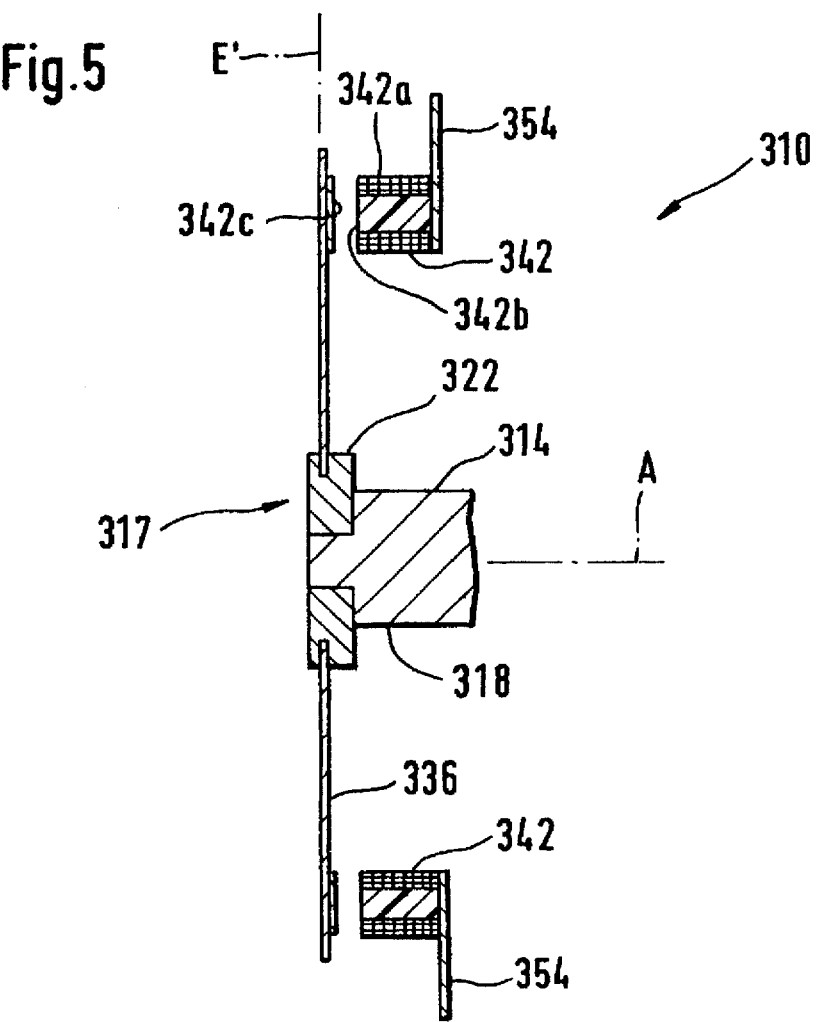
FIG. 5 is a view in cross section of an embodiment of a torque transmission device contemplated by the present invention.

FIG. 5 illustrates a fourth embodiment of a torque transmission device as contemplated by the present invention. Elements which correspond to elements of the embodiment illustrated in FIG. 1 are identified by the same reference numbers plus 300. FIG. 5 shows only the clutch element 317 which is connected to the drive output part 314. But it goes without saying that, as in the embodiments illustrated in FIGS. 1 and 2, the clutch element connected with the drive input part (not shown in FIG. 5) can have the same construction as the clutch element 317 connected to the drive output part 314.

In the embodiment illustrated in FIG. 5, the membrane element 336 is firmly connected in the vicinity of the axis of rotation A, i.e. in a central area, to a membrane carrier 322. The membrane carrier 322 is in turn non-rotationally connected in the vicinity of the axis of rotation A, i.e. in a central segment, to the drive output part 314. In this embodiment of the invention, the membrane element 336 is therefore fastened in its central area, and can be displaced or excited to vibrate in its radially outer area.

For the displacement of the membrane element 336, there are once again displacement means 342. As shown in FIG. 5, there are once again a multiplicity of displacement means located in the circumferential direction around the axis of rotation A. The displacement means 342 once again comprise an electric coil 342a which is wound around a core 342b. On each membrane element 336, there is an interaction element 342c. The interaction element 342c, as in the preceding embodiments, can be a second electric coil or an interaction part which is made of permanent magnet or magnetizable material. It is also possible that the interaction element can comprise the respective membrane element itself, if the latter is made of magnetizable material or, for example, of permanent magnet material. The displacement means 342 are fastened on respective carriers 354, which are installed in a stationary manner on a housing (not shown) of the torque transmission device 310. In other words, the part of the displacement means 342 not attached to the membrane element 336 is not rotationally connected to the membrane element 336.

For the displacement of the membrane element 336 by exciting the coils 342a, the coils 342a of the displacement means 342 following one another in the circumferential direction must each be excited with currents, on which an alternating current component is superimposed, the frequency of which alternating current component corresponds to the frequency of rotation, i.e. to the speed of rotation of the output part 314. Thus, once again, a static displacement of the membrane element 336 can be generated. On the other hand, also by means of an appropriate selection of the superimposed frequency components, it is possible to generate a displacement of the membrane element 336 which rotates in the circumferential direction, and thus once again, the torque transmission device illustrated in FIG. 5 can be used as a torque generation device and/or for the smooth synchronization of the speeds of rotation of the drive input and output parts.

But it is also possible, in the embodiment of the invention illustrated in FIG. 5, to non-rotationally connect the displacement means, as in the preceding embodiments, to the drive output part. In the preceding embodiments, it is also possible to provide the vibrationally isolated attachment of the displacement means illustrated in FIG. 5.

The membrane element 336 can be displaced statically by the displacement means 342, and it can also be excited to vibrate. Such a vibration excitation of the membrane element 336 is schematically illustrated in FIG. 5. The result is a vibration pattern which corresponds to a rosette shape, whereby the membrane element 336 has a number of axial displacement maxima M out of the membrane plane E' spanned by the axes B and C defined in FIG. 6. The membrane element 336 is thereby again preferably excited by the displacement means 342 into a natural vibration state, so that the maximum possible axial displacement can be achieved with the minimum possible amount of excitation energy. The vibration state illustrated in FIG. 6 then corresponds essentially to a standing wave. For the vibrational excitation, in place of the displacement means offset radially outward, it is also possible to provide a central displacement means, by means of which the membrane element or the membrane carrier, in the vicinity of the axis of rotation A, can be moved periodically back and forth, and by which the membrane element is made to vibrate.

But in the embodiment illustrated in FIG. 5, when there is a displacement of the membrane element by vibrational excitation, it is also possible to provide a displacement of the membrane element 336 which rotates in the circumferential direction U, in which case it is possible to divide the membrane element 336 into a multiplicity of separate membrane sector elements 336', 336", 336'". Corresponding to each of the membrane sector elements 336', 336" and 336'" there are respective displacement means or respective vibration generators 342', 342" or 342'". By means of the respective displacement means, each of the membrane sector elements 336', 336" and 336'" can in turn be excited in a natural vibration state, and then, by means of the appropriate selection of the vibration phase angle of the respective membrane sector elements 336', 336" and 336'" in relation to one another, a vibration pattern of the overall membrane element 335 can be generated which corresponds to a wave which moves in a circle in the circumferential direction. Thus, also in the embodiment illustrated in FIG. 5, when the membrane element 336 is displaced by vibrational excitation, it is possible to use a torque transmission device 310 contemplated by the present invention as a torque generation device and/or for the synchronization of the speeds of rotation of the drive input part and the drive output part.

In this context, it should be noted that also with regard to the embodiment of the invention illustrated in FIG. 2, it is possible to generate a displacement of the respective membrane elements which moves in a circle in the circumferential direction by vibrational excitement instead of by static displacement. For that purpose, the respective membrane elements would also then have to be divided into separate membrane sector elements, in which case there would be a vibration generator corresponding to each membrane sector element, and a composite vibration pattern would be generated by all the membrane sector elements which would correspond to a rotating wave.

The present invention provides a torque transmission device which can be constructed very simply and takes up only a small amount of space. A torque transmission device contemplated by the present invention can be used to achieve the coupling of the clutch elements on the drive input and drive output parts by means of a positive, interlocking engagement between axially displaced membrane elements, whereby in particular at the beginning of the clutch engagement, the generation of large amounts of heat and wear caused by friction of the clutch elements can be eliminated. Since in a torque transmission device contemplated by the present invention, the coupling is achieved by means of at least one membrane element, i.e. no components on the drive input side and the drive output side are rigidly coupled, it is possible that the drive input side of a torque transmission device contemplated by the present invention can be essentially vibrationally isolated from the drive output side. In other words, vibrations generated on the drive input side and/or on the drive output side, e.g. engine vibrations or body vibrations, are essentially not transmitted to the respective other side.

A torque transmission device contemplated by the present invention can also be used to generate a torque, and thereby makes it possible, for example if a torque transmission device contemplated by the present invention is used as a clutch device in a motor vehicle which is powered by an internal combustion engine, to omit the starter which would otherwise be necessary. A device contemplated by the present invention can also be used as a propulsion system for a vehicle or similar system.

Figure 8:
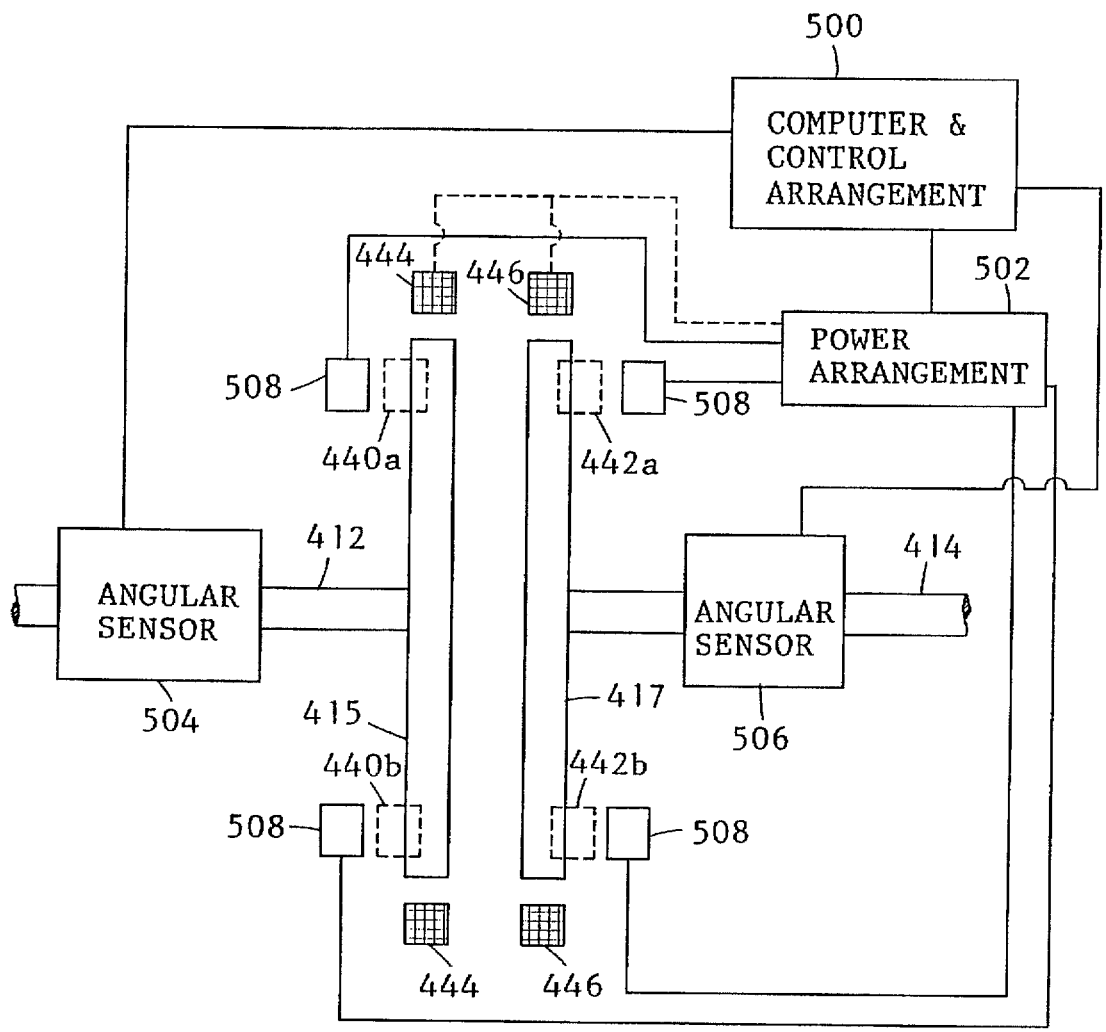
FIG. 8 is a schematic illustration of a control arrangement that may be utilized in accordance with the embodiments of the present invention.

The disclosure now turns to a further discussion of the embodiments illustrated in FIGS. 1–7, as well as a discussion of a possible control arrangement, as illustrated in FIG. 8.

With reference to FIG. 1, in accordance with a preferred embodiment of the present invention, it is conceivable to add further piezoelectric and/or magnetic elements to the clutch elements 15,17 at locations other than those shown as being occupied by elements 40 and 42. Particularly, it is conceivable to install elements at regions of clutch elements 15,17 that are disposed radially outwardly of elements 40,42, conceivably towards the outer periphery of clutch elements 15,17. In this manner, it is possible to afford the embodiment shown in FIG. 1 the capability of producing travelling waves, displacements or excursions, essentially in a manner analogous to that described hereinabove with relation to FIGS. 2 and 5.

Otherwise, if it is desired that a torque transmission device such as that shown in FIG. 1 be constructed without such a capability, it is conceivable to exclude the additional, radially outwardly disposed elements from the embodiment of FIG. 1 and utilize only the centrally located elements 40,42. Thus, in cases where it is desired that membranes 32,36 displace essentially only in an axial direction with respect to their corresponding clutch elements 15,17, whether as a static displacement or a vibrationally oscillating displacement, it would appear to be sufficient to use only the elements illustrated in FIG. 1.

Similar considerations as discussed immediately hereinabove with reference to FIG. 1 would appear to be equally relevant with respect to the embodiment illustrated in FIG. 3.

With continued reference to FIG. 1, it will be appreciated that, for desirable results, membranes 32,36 could be controlled in such a manner that, with respect to various regions disposed about the circumference of clutch elements 15,17, there will not be mutually matching vibration frequencies, amplitudes, and phases. Particularly, it will be appreciated that, in an instance in which the vibrating patterns of membranes 32,36 essentially match one another, that is with similar phase, amplitude and frequency, at all regions about the entire circumference of the membranes 32,36, there may result a phenomenon in which, for a very, brief moment during axial vibration, neither of the membranes 32,36 will exhibit any peaks or valleys of any kind along their respective surfaces, possibly resulting in temporary disengagement of clutch elements 15 and 17 with respect to one another. In other words, in a state of mutually matching vibration patterns, it is conceivable that the mutually vibrating membranes 32,36 will periodically traverse a "zero" state, in which, during oscillation from one side to another, the membrane surfaces 32,36 will essentially be flat and oriented essentially parallel to one another, conceivably in spaced-apart relation to one another. Thus, it would appear to be particularly desirable to ensure that aspects of the vibrating patterns of each of the membranes element 32,36 do not match the vibrating pattern of the other membrane element 32 or 36, to ensure that, at any given time during axial vibration, at least one portion of one membrane element protrudes into at least one portion of the other membrane element, to permit the type of mutually interengaging relationship that promotes the successful transfer of torque from one membrane element to the other.

The materials employed for membrane elements 32,36 may be selected in a manner that best suits the operating context at hand. Preferably, membrane elements will be sufficiently thin to permit their successful deformation in response to the types of stimuli discussed heretofore, yet sufficiently strong to permit the successful transfer of torque from one clutch element to the other. Such materials would appear to be well-known to those of ordinary skill in the art, and would not appear to warrant further discussion herein.

It is conceivable to configure membrane elements 32,36 in such a manner that each will have portions that facilitate deformation in predetermined patterns. This may be accomplished, for example, by configuring each membrane element 32,36 to exhibit varying density, spring constant or thickness over its extent. In embodiments in which a capacitive principle is utilized, each membrane element could conceivably exhibit varying electrostatic potential over its extent.

In embodiments in which a capacitive principle is utilized for deforming membrane elements 32,36, it is conceivable, if not preferred, to apply a dielectric material on either or both of the membrane elements 32,36, to ensure that the membrane elements 32,36 themselves will not come into direct contact with one another.

It will be understood that the provisions discussed hereinabove with respect to membrane elements 32,36 are equally relevant to: the membrane elements 132,136 shown in FIG. 2; the membrane element 232 shown in FIG. 3; and the membrane element 336 shown in FIG. 5.

Figure 6:
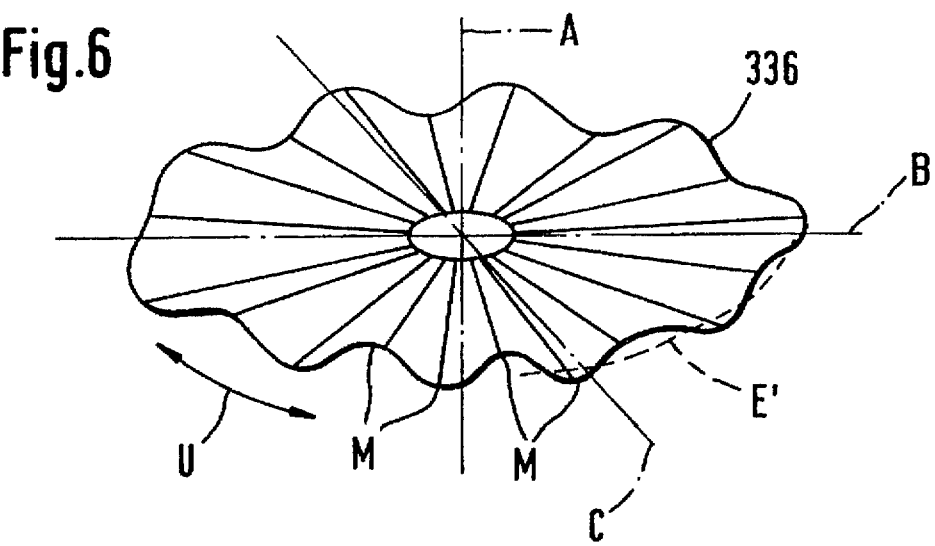
FIG. 6 is a view in perspective of the torque transmission device illustrated in FIG. 5, in a state in which the membrane element is excited in vibration.
Figure 7:
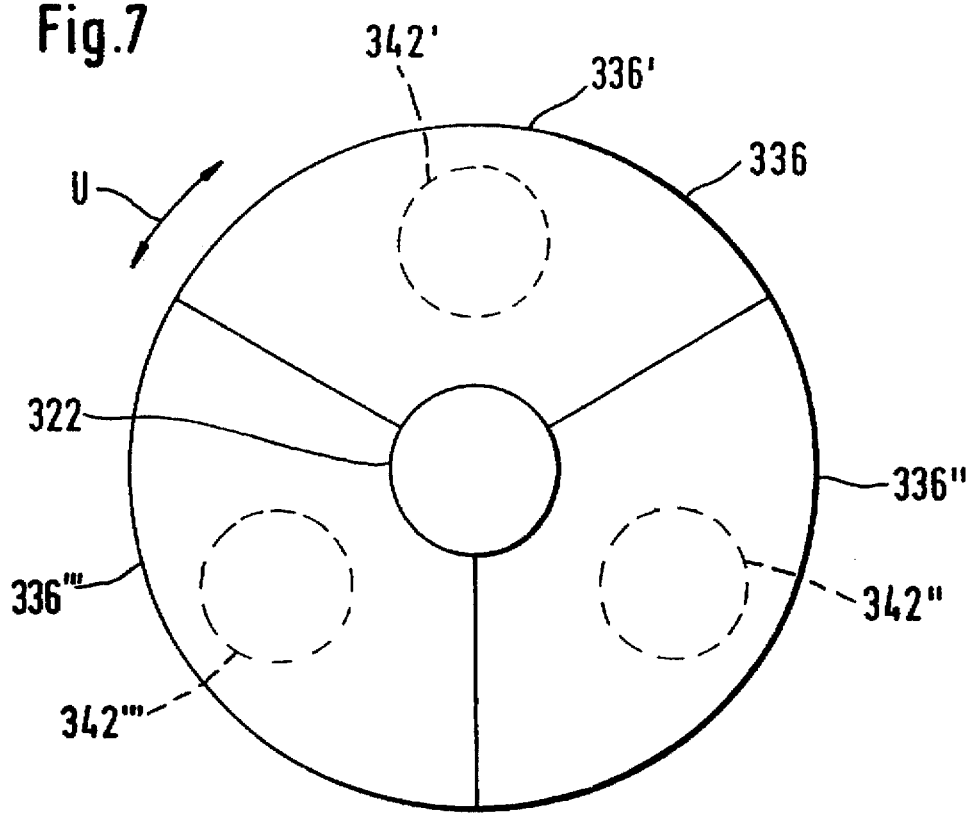
FIG. 7 is a plan view of a schematic diagram of a membrane element consisting of membrane sector elements.

FIG. 6 shows a possible pattern of deformation that may be produced in accordance with the embodiments of the present invention. For production of the pattern shown in FIG. 6, it is conceivable that ten elements 142 or 342 may be provided (see FIGS. 2 and 5, respectively). The membrane elements illustrated in FIGS. 1 and 3 may be similarly deformed in a manner discussed heretofore.

with respect to the embodiment illustrated in FIG. 3, the material selected for membrane application element 252 will preferably be sufficient for adequately accommodating protruding portions of membrane element 232 and for permitting such protruding portions to successfully transfer torque from clutch element 215 to clutch element 217. Such materials would appear to be well-known to those of ordinary skill in the art, and would not appear to warrant further discussion herein.

FIG. 8 schematically illustrates a control arrangement, and associated components, that may be utilized in accordance with the embodiments of the present invention.

Indicated at 412 and 414 are input and output shafts, respectively, with associated clutch elements 415 and 417. Disposed about clutch elements 415 and 417, respectively, are coils 444 and 446, similar to those described and illustrated heretofore with reference to FIGS. 1–7. Further, elements 440a, 440b, 442a and 442b, for providing either a magnetic force for deforming the membrane element (not shown in FIG. 8) associated with each respective clutch element 415, 417, or for providing a piezoelectric deformation, substantially to the type described and illustrated heretofore, are provided.

Preferably, a control arrangement 500 may be provided to suitably control the electric power provided to the elements 440a,b and 442a,b. Such an arrangement 500 could contain suitable computer circuitry for performing functions described further below.

In embodiments in which the elements 440a,b and/or 442a,b are configured to undergo orbital motion about axis A relative to the corresponding clutch element 415,417, the speed of rotation of the elements 440a,b and/or 442a,b can conceivably be governed with relation to the rotational speed of corresponding shaft 412, 414 (end consequently to the rotational speed of corresponding clutch element 415, 417). Alternatively, in the context of elements 440a,b and 442a,b that are mounted stationarily with respect to the corresponding clutch element 415, 417, and especially in the case in which the electric power provided to the elements may be controlled, by control arrangement 500, in such a way as to successively activate the elements 440a,b and 442a,b, as well as other similar elements that may be provided.

Power may be provided via a power arrangement 502. Conceivably, computer and control arrangement 500 could be configured so as to control the output from power arrangement 502 in response to either a predetermined computer program, or stimuli measured with respect to the torque transmission device, or both. Accordingly, elements 440a,b and 442a,b, as well as other similar elements, if any, could be provided with varying amounts of electrical power in order to displace the membrane elements (not shown) in a desired manner, with desired vibration patterns, amplitudes, frequencies, phase, etc. Further, if a "travelling wave" or "travelling protrusion" is to be utilized (i.e. a wave or protrusion on a membrane element that orbits, with respect to the clutch elements, about the rotational axis of the clutch elements), the computer and control arrangement could be configured to regulate the parameters relating to such phenomena. In this manner, if, for example, a gradual engagement of clutch elements 415 and 417 is desired, the "travelling wave" or "travelling protrusion" phenomenon could be regulated in such a manner as to specify the length of time between a full rotational velocity of a "travelling wave" or "travelling protrusion" with respect to the corresponding clutch element 415 or 417 and a zero rotational velocity of the same.

Preferably, suitable slip rings or the like 508 may be provided to facilitate the provision of electrical power to elements 440a,b and 442a,b.

In accordance with at least one preferred embodiment of the present invention coils 444 and 446 could feed into and out of power arrangement 502, such that any current induced in either or both of the coils 444,446 could be appropriately transferred to elements 440a,b and 442a,b. This would be particularly true of a starting operation, in order to provide electric power to elements 440a,b and/or 442a,b upon forced rotation of output shaft 414.

Conceivably, angular sensors 504,506 may be provided, respectively, on shafts 412,414, in order to provide feedback to the control arrangement 500, with regard to the speed and/or position of the shafts 412,414, for the purpose of further regulating the power provided to elements 440a,b and 442a,b.

It is to be understood that the arrangement illustrated in FIG. 8, within the, scope of the present invention, may be provided, in whole or in part, in conjunction with any of the embodiments illustrated in FIGS. 1–7. However, it is also to be understood that the arrangement illustrated in FIG. 8 is provided only as an example and is in no way meant to limit the scope of the present invention to such an arrangement.

It is to be understood that various parameters for governing rotational speed of protrusions, vibration amplitudes, vibration frequencies, vibration phase, and other parameters discussed throughout this specification, may be determined in a manner that is best suited to the operating environment at hand, with a view to optimizing performance in the operating environment at hand. In this respect, it is conceivable to determine such parameters through routine experimentation, with a view to optimizing performance in the operating environment at hand.

One feature of the invention resides broadly in the torque transmission device 10; 110; 210; 310 for the selective transmission of a torque between drive input parts 12; 112; 212 and drive output, parts 14; 214; 314 which rotate relative to one another around an axis of rotation A, comprising: a first clutch element 15; 115; 215 which is non-rotationally connected to the drive input part 12; 112, 212, a second clutch element 17; 117; 217; 317 which is non-rotationally connected to the drive output part 14; 114; 214; 314 and can be brought into selective torque transmission engagement with the first clutch element 15; 115; 215, whereby the first and/or the second clutch element 15, 17; 115, 117; 215; 317 comprises a membrane element 32, 36; 132, 136; 232; 336 being oriented in a membrane plane E, E', the membrane plane being oriented essentially orthogonally to the axis of rotation A, displacement/excursion/deflection means 40, 42; 140, 142; 240; 342 corresponding to the respective membrane element 32, 36; 132, 136; 232; 336 for the generation of an axial displacement of the respective membrane element 32, 36; 132, 136; 232; 336 for the torque transmission engagement, whereby the respective membrane element 32, 36; 132, 136; 232; 336, in the displacement state, comprises at least one axial displacement maximum M1, M2, M3, M4; M in a circumferential direction U of the respective membrane element 32, 36; 132, 136; 232.

Another feature of the invention resides broadly in the torque transmission device characterized by the fact that the first or the second clutch element 215 comprises a membrane element 232, that the respective other clutch element comprises a membrane application element 250, 252 and that the membrane element 232 can be displaced by the displacement means 240 in the displaced status so that the membrane element 232, in the vicinity of the at least one axial displacement maxima, presses against the membrane application element 250, 252.

Yet another feature of the invention resides broadly in the torque transmission device characterized by the fact that the membrane application element 250, 252 comprises an elastically deformable application lining 252 on the other clutch element 217.

Still another feature of the invention resides broadly in the torque transmission device characterized by the fact that the first clutch element 15; 115 comprises a first membrane element 32; 132 and that the second clutch element 17; 117 comprises a second membrane element 36; 136, whereby, in the displaced state, the first and/or the second membrane element 32, 36; 132, 136 can be displaced by the respective corresponding displacement means 40, 42; 140, 142 toward the respective other membrane element 32, 36; 132, 136.

A further feature of the invention resides broadly in the torque transmission device characterized by the fact that the respective displacement means 40, 42 comprise at least one piezoelectric membrane deflector 40, 42.

Another feature of the invention resides broadly in the torque transmission device characterized by the fact that the respective displacement means 140, 142; 240; 342 comprise at least one electromagnetic membrane deflector 140, 142; 240; 342.

Yet another feature of the invention resides broadly in the torque transmission device characterized by the fact that the at least one electromagnetic membrane deflector 140, 142; 240; 342 comprises at least one first electrical coil 140a, 142a; 240a; 342a which is separate from the membrane element 132, 136; 232; 336 and an interaction element, or reciprocal action element, 140c, 142c; 240c; 342c which is on the membrane element 132, 136; 232; 336 and which corresponds to the first electrical coil 140a, 142a; 240a; 342a.

Still another feature of the invention resides broadly in the torque transmission device characterized by the fact that the interaction element 140c, 142c; 240c; 342c comprises a second electrical coil.

A further feature of the invention resides broadly in the torque transmission device characterized by the fact that the interaction element 140c, 142c; 240c; 342c comprises an interaction part made of magnetizable material or permanent magnet material, or comprises the membrane element.

Another feature of the invention resides broadly in the torque transmission device characterized by the fact that the at least one membrane deflector 40, 42; 240 is located on the corresponding clutch element 15, 17; 215 in the vicinity of the axis of rotation A.

Yet another feature of the invention resides broadly in the torque transmission device characterized by the fact that the at least one membrane deflector 140, 142; 342 is offset radially outward from the axis of rotation A.

Still another feature of the invention resides broadly in the torque transmission device characterized by the fact that there are a multiplicity of membrane deflectors 140, 142; 342 located in the circumferential direction U around the axis of rotation A.

A further feature of the invention resides broadly in the torque transmission device characterized by the fact that the at least one membrane deflector 40, 42; 140, 142; 240 is fastened on a membrane carrier 20, 22; 120, 122; 220 of the respective clutch element 15, 17; 115, 117; 215.

Another feature of the invention resides broadly in the torque transmission device characterized by the fact that the at least one membrane deflector 342 is located on a membrane deflector carrier 354 which is rotationally decoupled, or isolated, from the corresponding clutch element 317.

Yet another feature of the invention resides broadly in the torque transmission device characterized by the fact that the displacement means corresponding to the respective membrane elements comprise the respective other membrane element or the membrane application element.

Still another feature of the invention resides broadly in the torque transmission device characterized by the fact that the membrane element, or membrane application element, forming the respective displacement means, comprises, for the purpose of electrostatic and/or magnetic in station with the other membrane element at least in areas, at least one area located in the circumferential direction that has a modifiable electrostatic charge and/or magnetic polarization.

A further feature of the invention resides broadly in the torque transmission device characterized by the fact that a multiplicity of such areas are located one after the other in the circumferential direction.

Another feature of the invention resides broadly in the torque transmission device characterized by the fact that the areas essentially comprise the entire circumference of the respective membrane element or membrane application element.

Yet another feature of the invention resides broadly in the torque transmission device characterized by the fact that the respective displacement means 40, 42; 140, 142; 240; 342 comprise at least one vibration generator, or exciter, or oscillation generator, to generate an axial vibration of the respective membrane element 32, 36; 132, 136; 232; 336, whereby the displaced state of the respective membrane element 32, 36; 132, 136; 232; 336 is a vibration state.

Still another feature of the invention resides broadly in the torque transmission device characterized by the fact that the respective membrane element 32, 36; 132, 136; 232; 336 can be excited by the at least one vibration generator in at least one natural vibration state.

A further feature of the invention resides broadly in the torque transmission device characterized by the fact that the at least one natural vibration state is a standing wave, and that one natural vibration shape of the first or second membrane element 32, 36; 132, 136; 232; 336 is a whole-number multiple of a natural vibration shape of the respective other membrane element 32, 36; 132, 136; 232; 336.

Another feature of the invention resides broadly in the torque transmission device characterized by the fact that the first and/or the second membrane element 336 comprises a number of separate membrane sector elements 336', 336'', 336''' one after another in the circumferential direction, and that corresponding to each membrane sector element 336', 336'' there is at least one membrane deflector 342', 342'', 342'''.

Yet another feature of the invention resides broadly in the torque transmission device characterized by the fact that the respective membrane element 32, 36; 132, 136; 232 is non-rotationally connected in the vicinity of its outside circumferential edge to a membrane carrier 20, 22; 120, 122; 220 of the respective clutch element 15, 17; 115, 117; 215.

Still another feature of the invention resides broadly in the torque transmission device characterized by the fact that the corresponding membrane element 336 is non-rotationally connected in the vicinity of the axis of rotation A by means of a radially inward segment of the same membrane element to a membrane carrier 322 of the respective clutch element 317.

A further feature of the invention resides broadly in the torque transmission device characterized by a lock-up clutch device for the rigid transmission of torque between the first and second clutch elements.

Another feature of the invention resides broadly in the use of the torque transmission device as a clutch device, in particular in a motor vehicle.

Yet another feature of the invention resides broadly in the clutch device, in particular for a motor vehicle: comprising of a torque transmission device, means for the detection of a difference in the speed of rotation of the drive input part and the output part, displacement means for the generation of at least one axial displacement, axial excursion or axial deflection of each of the first and/or second membrane elements, whereby the at least one axial displacement of the first and/or of the second membrane element moves in a circle (i.e. rotates or moves circularly) in the circumferential direction with respect to the drive input part or the drive output part, and whereby the at least one axial displacement of the first and/or second membrane element moves in a circle at a speed of rotation, with respect to the drive input part or the drive output part, so that at the beginning of a clutch engagement procedure, the relative speed of rotation between the at least one displacement maximum of the first membrane element, and the at least one displacement maximum of the second membrane element with respect to a stationary coordinate system, is essentially zero, means to modify the speed of rotation of the at least one displacement maximum of the first membrane element or of the at least one displacement maximum of the second membrane element with respect to the drive input part and the drive output part, respectively, to essentially zero.

Still another feature of the invention resides broadly in the starter device, in particular for a motor vehicle with an internal combustion engine, comprising: a torque transmission device, displacement means for the generation of at least one axial displacement, respectively, of the first membrane element and/or of the second membrane element, whereby the displacement means on the first and/or second membrane element generate at least one displacement which moves in a circle in the circumferential direction, whereby the relative speed of rotation of the at least one displacement maximum of the first membrane element, with respect to the at least one displacement maximum of the second membrane element, is different from zero in a stationary coordinate system.

A further feature of the invention resides broadly in the use of the starter apparatus as a clutch device.

Another feature of the invention resides broadly in the torque transmission device with active vibration isolation, in particular for a motor vehicle with an internal combustion engine, comprising: a torque transmission device, displacement means for the generation of at least one axial displacement of the first membrane element and/or of the second membrane element, means for the measurement of a vibration excitation of the drive output part and/or of the drive input part, and means for the control of the at least one displacement of the first and/or second membrane element, such that the vibration excitation of the drive input part and/or of the drive output part is not transmitted to the respective other part.

Yet another feature of the invention resides broadly in the torque transmission device characterized by the fact that the displacement means on the first and/or second membrane element generate at least one displacement which moves in a circle in the circumferential direction, and that the means to control the displacement comprise means to generate, in the circumferential direction, an oscillating displacement maximum of the first and/or second membrane element with respect to a stationary coordinate system, whereby the rotational velocity of the at least one displacement maximum of the first membrane element essentially equals the rotational velocity of the at least one displacement maximum of the second membrane element.

Still another feature of the invention resides broadly in the torque transmission device characterized by the fact that the means to control the at least one displacement maximum of the first and/or of the second membrane element comprise means to vary the amplitude of the at least one displacement maximum of the first and/or second membrane element.

A further feature of the invention resides broadly in the drive device, in particular for a motor vehicle, comprising: a torque transmission device, displacement means for the generation of at least one axial displacement of the first membrane element and/or of the second membrane element respectively, whereby the displacement means on the first and/or second membrane element generate, respectively, at least one displacement which moves in a circle in the circumferential direction, whereby the relative rotational velocity of the at least one displacement maximum of the first membrane element with respect to the at least one displacement maximum of the second membrane element in a stationary coordinate system is different from zero.

Examples of piezoelectric arrangements, which may be utilized in accordance with the embodiments of the present invention, may be found in the following U.S. Pat. Nos.: 5,179,311, which issued to Suganuma on Jan. 12, 1993; 5,191,688, which issued to Takizawa et al. on Mar. 9, 1993; 5,247,200, which issued to Miyazawa et al. on Sep. 21, 1993; 5,334,096, which issued to Iwao on Aug. 2, 1994; and 5,336,960, which issued to Shimizu et al. on Aug. 9, 1994.

Examples of slip ring/sliding contact arrangements, which may be utilized in accordance with the embodiments of the present invention, may be found in the following U.S. Pat.

Nos.: 5,191,179, which issued to Yatchum et al. on Mar. 2, 1993; 5,214,335, which issued to Phillips et al. on May 25, 1993; 5,220,588, which issued to Deucher et al. on Jun. 15, 1993; 5,224,138, which issued to Hirao et al. on Jun. 29, 1993; 5,254,896, which issued to Bradfield et al. on Oct. 19, 1993.

Examples of control arrangements, which may be utilized in accordance with the embodiments of the present invention, may be found in the following U.S. Pat. Nos.: 5,192,889, which issued to Myohga on Mar. 9, 1993; 5,198,732, which issued to Morimoto on Mar. 30, 1993; 5,214,339, which issued to Naito on May 25, 1993; 5,258,694, which issued to Ohnishi et al. on Nov. 2, 1993; 5,365,139, which issued to Kasuga et al. on Nov. 15, 1994.

Examples of electromagnetic coil arrangements, which may be utilized in accordance with the embodiments of the present invention, may be found in the following U.S. Pat. Nos.: 4,368,417, which issued to Matsyuyama on Jan. 11, 1983; 4,459,490, which issued to Brandon on Jul. 10, 1984; 4,578,734, which issued to Delbosse on Mar. 25, 1986; 4,583,723, which issued to Ozawa on Apr. 22, 1986.

Examples of magnetic transducer arrangements, which may be utilized in accordance with the embodiments of the present invention, may be found in the following U.S. Pat. Nos.: 5,203,287, which issued to Wiley on Apr. 20, 1993; 5,268,879, which issued to Flanagan on Dec. 7, 1993; 4,905,507, which issued to Klein et al. on Mar. 6, 1990; 4,992,734, which issued to Adachi on Feb. 12, 1991; 4,406,168, which issued to Meixner on Sep. 27, 1983; 4,406,983, which issued to Ramirez on Sep. 27, 1983; 4,410,769, which issued to Tibbetts on Oct. 18, 1983; 4,455,516, which issued to Furusho on Jun. 19, 1984; 4,517,514, which issued to Howell on May 14, 1985; 4,594,524, which issued to Sudo on Jun. 10, 1986.

Types of transmissions in which the present invention may be incorporated may be disclosed in the following U.S. Pat. Nos.: 5,199,316 to Hoffman on Apr. 6, 1993, entitled "Fully-synchronized Multiple Speed Manual Transmission for Motor Vehicles"; U.S. Pat. No. 4,458,551 to Winter on Jul. 10, 1984, entitled "Manual Transmission"; and U.S. Pat. No. 3,858,460 to Porter et al. on Jan. 1, 1975, entitled "Four Speed Manual Transmission and Control".

Types of clutch assemblies may be disclosed in the following U.S. Pat. Nos. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

Types of two-mass flywheels may be disclosed in the following U.S. Pat. No. 5,103,688 to Kuhne on Apr. 14, 1992, entitled "Two-mass Flywheel"; and U.S. Pat. No. 4,777,843 to Bopp on Oct. 18, 1988, entitled "Two-mass Flywheel Assembly with Viscous Damping Assembly".

The components disclosed in the various, publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 43 454.5, filed on Dec. 7, 1994, having inventor Jörg Sudau, and DE-OS P 44 43 454.5 and DE-PS P 44 43 454.5 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed:

1. A clutch for a motor vehicle transmission for transmitting torque between a motor and wheels, said clutch comprising:

a first member;

said first member comprising a portion;

said first member comprising means for non-rotational connection to one of: a motor and a transmission to rotate therewith;

a second member;

said second member comprising means for non-rotational connection to the other of: a motor and a transmission to rotate therewith;

said second member being disposed adjacent to said first member;

means for engaging said first member and said second member to transmit torque; and said means for engaging said first member and said second member to transmit torque comprising:

said portion of said first member;

said portion of said first member comprising a membrane; and means for deforming said membrane to engage said membrane with said second member.

2. The clutch according to claim 1, wherein:

said membrane is disposed substantially perpendicular to an axis of rotation of said clutch;

said means for deforming said membrane to engage said membrane with said second member comprises means for displacing at least a portion of said membrane towards said second member to engage said membrane with said second member; and the displacement of said at least a portion of said membrane is substantially parallel to the axis of rotation of said clutch.

3. The clutch according to claim 2, wherein:

said at least a portion of said membrane comprises a plurality of regions;

said plurality of regions are disposed about the axis of rotation;

said plurality of regions comprises at least one first region; and said means for displacing at least a portion of said membrane towards said second member comprises means for displacing said at least one first region a substantially greater distance towards said second member than the other of said plurality of regions towards said second member.

4. The clutch according to claim 3, wherein:

said membrane of said first member is a first membrane;

said second member comprises a portion;

said means for engaging said first member and said second member further comprises:

said portion of said second member;

said portion of said second member comprises a second membrane;

said second membrane is disposed substantially perpendicular to the axis of rotation; and said second membrane is disposed adjacent to said first membrane; and said means for deforming said membrane to engage said membrane with said second member is disposed to engage said at least one, first region of said first membrane with said second membrane.

5. The clutch according to claim 4, wherein:

said means for engaging said first member and said second member further comprises means for deforming said second membrane to engage said second membrane with said first membrane;

said means for deforming said second membrane to engage said second membrane with said first membrane comprises means for displacing at least a portion of said second membrane towards said first membrane to engage said at least a portion of said second membrane with said first membrane;

said at least a portion of said second membrane comprises a plurality of regions;

said plurality of regions of said second membrane is disposed about the axis of rotation;

said plurality of regions of said second membrane comprises at least one first region; and said means for displacing at least a portion of said second membrane towards said first membrane comprises means for displacing said at least one first region of said second membrane a substantially greater distance towards said first membrane than the other of said plurality of regions of said second membrane towards said first membrane.

6. The clutch according to claim 5, wherein:

said means for displacing said at least one first region towards said second member is a first displacement means;

said means for displacing, said at least one first region of said second membrane towards said first membrane is a second displacement means; and at least one of: said first displacement means and said second displacement means comprises one of the following A), B) and C):

A) piezoelectric means;

B) electromagnetic means; and

C) the corresponding one of: said first membrane and said second membrane disposed adjacent to said at least one of: said first displacement means and said second displacement means.

7. The clutch according to claim 6, wherein:

said at least one of: said first displacement means and said second displacement means comprises C);

said corresponding one of: said first membrane and said second membrane represents a corresponding membrane;

said at least one of: said first displacement means and said second displacement means comprises means for interacting with said corresponding membrane; and said means for interacting with said corresponding membrane comprises:

at least one area of said plurality of regions of said corresponding membrane; and said at least one area of said plurality of regions of said corresponding membrane comprises at least one of:

D) means for modifying an electrostatic charge disposed on said at least one area; and E) means for modifying a magnetic polarization of said at least one area.

8. The clutch according to claim 7, wherein:

said corresponding membrane comprises an axis of rotation;

said at least one area comprises a plurality of said areas;

said plurality of said areas is disposed about the axis of rotation of said corresponding membrane;

each of said plurality of areas is disposed adjacent to another one of said plurality of areas; and said plurality of areas is disposed to subtend an angle of substantially 360 degrees about the axis of rotation of said corresponding membrane.

9. The clutch according to claim 8, wherein:

said means for interacting with said corresponding membrane comprises means for generating a natural vibration of said corresponding membrane;

said means for generating a natural vibration of said corresponding membrane comprises at least one vibration generator;

said at least one vibration generator comprises means for generating a standing wave in said plurality of areas of said corresponding membrane; and said standing wave generated in said plurality of areas of said corresponding membrane is a whole-number multiple of a natural frequency of said other membrane.

10. The clutch according to claim 9, wherein:

said plurality of areas of said corresponding membrane comprises a plurality of elements;

said plurality of elements is disposed about the axis of rotation of said corresponding membrane;

said at least one vibration generator comprises a plurality of vibration generators; and each of said plurality of vibration generators is disposed to vibrate a corresponding one of said plurality of elements.

11. The clutch according to claim 10, wherein:

said first member comprises a first membrane carrier;

said first membrane carrier is disposed concentrically about the axis of rotation of said clutch;

said clutch comprises means for non-rotationally attaching said first membrane to said first membrane carrier;

said second member comprises a second membrane carrier;

said second membrane carrier is disposed concentrically about the axis of rotation of said clutch;

said clutch comprises means for non-rotationally attaching said second membrane to said second membrane carrier; and each of said means for nonrotationally attaching said first and second membranes comprises one of the following F) and G):

F) said first membrane comprises an outer portion;
said outer portion of said first membrane is disposed at the radial periphery of said first membrane;
said outer portion of said first membrane is attached to said first membrane carrier;
said second membrane comprises an outer portion;
said outer portion of said second membrane is disposed at the radial periphery of said second membranes; and
said outer portion of said second membrane is attached to said second membrane carrier;

G) said second membrane comprises an inner portion;
said inner portion of said first membrane is disposed about an inner radial periphery of said first membrane,
said inner portion of said first membrane is attached to said first membrane carrier;
said second membrane comprises an inner portion,
said inner portion of said second membrane is disposed about an inner radial periphery of said second membrane; and
said inner portion of said second membrane is attached to said second membrane carrier.

12. The clutch according to claim 11, wherein:

each of said means for non-rotationally attaching said first and second membranes comprises G), said means for generating a standing wave comprises means for generating a lock-up clutch for the rigid transmission of torque between said first and second members; and said clutch further comprises:
means for detecting a difference in the speed of rotation of a motor and a transmission;
displacement means for the generating of at least one axial displacement of each of said first and second membranes, whereby the at least one axial displacement of each of said first and second membranes moves in a circle in the circumferential direction with respect to one of the motor and the transmission, and whereby the at least one axial displacement of each of said first and second membranes moves in a circle at a speed of rotation, with respect to one of the motor and the transmission, at the beginning of a clutch engagement procedure, the relative speed of rotation between the at least one displacement maximum of said first membrane and the at least one displacement maximum of said second membrane with respect to a stationary coordinate system, is essentially zero; and
means for modifying the speed of rotation of the at least one displacement maximum of said first membrane and the at least one displacement maximum of said second membrane with respect to the corresponding one of the motor and the transmission, respectively, to essentially zero.

13. The clutch according to claim 6, wherein:

said at least one of: said first displacement means and said second displacement means comprises B);

said electromagnetic means comprises at least one electromagnetic membrane deflector;

said at least one electromagnetic membrane deflector comprises:
at least one first electrical coil;
said at least one first electrical coil is disposed a substantial distance from the corresponding membrane of said first displacement means and said second displacement means;
at least one interaction element;
said at least one interaction element is disposed on said corresponding membrane of said first displacement means and said second displacement means;
said at least one interaction element comprises at least one of the following H), I) and J):
H) at least one second electrical coil;
I) one of: a magnetizable material and a permanent magnet material; and
J) an area of said corresponding membrane of said first displacement means and said second displacement means; and
said at least one first electrical coil is disposed at one of the following locations K) and L):
K) substantially about the axis of rotation of said clutch and disposed on the corresponding said first member and said second member comprising said at least one first electrical coil; and
L) a substantial radial distance from the axis of rotation of said clutch.

14. The clutch according to claim 13, wherein:

said at least one first electrical coil is disposed at the location L);

said electromagnetic means comprises a plurality of said at least one electromagnetic membrane deflectors;

said plurality of electromagnetic membrane deflectors comprises a plurality of said at least one first electrical coil;

said plurality of said first electrical coils is disposed about the axis of rotation of said clutch;

said clutch comprises means for fastening said plurality of first electrical coils; and said means for fastening said plurality of first electrical coils comprising one of the following M) and N):
M) means for non-rotationally connecting each of said plurality of first electrical coils to the corresponding first member and second member comprising said plurality of first electrical coils; and
N) means for de-coupling said plurality of said first electrical coils from the rotation of said clutch;
said means for de-coupling comprises a carrier; and
said plurality of first electrical coils is attached to said carrier.

15. A starter for a motor vehicle, in particular for a motor vehicle with an internal combustion engine, said starter comprising:

a first member;

said first member comprising a portion;

a second member;

one of: said first member and said second member comprising means for-non-rotational connection to an engine to rotate therewith;

said second member being disposed adjacent to said first member;

means for engaging said first member and said second member to transmit torque to rotate the motor for starting; and said means for engaging said first member and said second member to transmit torque to rotate the motor for starting comprising:

said portion of said first member;
said portion of said first member comprising a membrane; and
means for deforming said membrane to engage said membrane with said second member.

16. The starter according to claim 15, wherein:
said membrane is disposed substantially perpendicular to an axis of rotation of said starter;
said means for deforming said membrane to engage said membrane with said second member comprises means for displacing at least a portion of said membrane towards said second member to engage said membrane with said second member;
the displacement of said portion of said membrane is substantially parallel to the axis of rotation of said starter;
said portion of said membrane comprises a plurality of regions;
said plurality of regions are disposed about the axis of rotation;
said plurality of regions comprises at least one first region;
said means for displacing at least a portion of said membrane towards said second member comprises means for displacing said at least one first region a substantially greater distance towards said second member than the other of said plurality of regions towards said second member;
said membrane of said first member is a first membrane;
said second member comprises a portion;
said means for engaging said first member and said second member further comprises:
said portion of said second member;
said portion of said second member comprises a second membrane;
said second membrane is disposed substantially perpendicular to the axis of rotation; and
said second membrane is disposed adjacent to said first membrane;
said means for deforming said membrane to engage said membrane with said second member is disposed to engage said at least one first region of said first membrane with said second membrane;
said means for engaging said first member and said second member further comprises means for deforming said second membrane to engage said second membrane with said first membrane;
said means for deforming said second membrane to engage said second membrane with said first membrane comprises means for displacing at least a portion of said second membrane towards said first membrane to engage said portion of said second membrane with said first membrane;
said portion of said second membrane comprises a plurality of regions;
said plurality of regions of said second membrane is disposed about the axis of rotation;
said plurality of regions of said second membrane comprises at least one first region;
said means for displacing at least a portion of said second membrane towards said first membrane comprises means for displacing said at least one first region of said second membrane a substantially greater distance towards said first membrane than the other of said plurality of regions of said second membrane towards said first membrane;
said means for displacing said at least one first region towards said second member is a first displacement means;
said means for displacing said at least one first region of said second membrane towards said first membrane is a second displacement means; and
at least one of: said first displacement means and said second displacement means comprises one of the following A), B) and C):
A) piezoelectric means;
B) electromagnetic means; and
C) the corresponding one of: said first membrane and said second membrane disposed adjacent to said at least one of:
said first displacement means and said second displacement means;
said first member comprises a first membrane carrier;
said first membrane carrier is disposed concentrically about the axis of rotation of said starter;
said starter comprises means for non-rotationally attaching said first membrane to said first membrane carrier;
said second member comprises a second membrane carrier;
said second membrane carrier is disposed concentrically about the axis of rotation of said starter;
said starter comprises means for non-rotationally attaching said second membrane to said second membrane carrier; and
each of said means for non-rotationally attaching said first and second membranes comprises one of the following items D) and E):
D) said first membrane comprises an outer portion;
said outer portion of said first membrane is disposed at the radial periphery of said first membrane;
said outer portion of said first membrane is attached to said first membrane carrier;
said second membrane comprises an outer portion;
said outer portion of said second membrane is disposed at the radial periphery of said second membrane; and
said outer portion of said second membrane is attached to said second membrane carrier;
E) said second membrane comprises an inner portion;
said inner portion of said first membrane is disposed about an inner radial periphery of said first membrane;
said inner portion of said first membrane is attached to said first membrane carrier;
said second membrane comprises an inner portion;
said inner portion of said second membrane is disposed about an inner radial periphery of said second membrane; and
said inner portion of said second membrane is attached to said second membrane carrier.

17. The starter according to claim 16, wherein:
said at least one of: said first displacement means and said second displacement means comprises C);
said corresponding one of: said first membrane and said second membrane represents a corresponding membrane;
said corresponding membrane comprises an axis of rotation;
said at least one of: said first displacement means and said second displacement means comprises means for interacting with said corresponding membrane;

said means for interacting with said corresponding membrane comprises:
  at least one area of said plurality of regions of said corresponding membrane; and
  said at least one area of said plurality of regions of said corresponding membrane comprises at least one of:
    F) means for modifying an electrostatic charge disposed on said at least one area; and
    G) means for modifying a magnetic polarization of said at least one area;
said at least one area comprises a plurality of said areas;
said plurality of said areas is disposed about the axis of rotation of said corresponding membrane;
each of said plurality of areas is disposed adjacent to another one of said plurality of areas;
said plurality of areas is disposed to subtend an angle of substantially 360 degrees about the axis of rotation of said corresponding membrane;
said means for interacting with said corresponding membrane comprises means for generating a natural vibration of said corresponding membrane;
said means for generating a natural vibration of said corresponding membrane comprises at least one vibration generator;
said at least one vibration generator comprises means for generating a standing wave in said plurality of areas of said corresponding membrane;
said standing wave generated in said plurality of areas of said corresponding membrane is a whole-number number multiple of a natural frequency of the other membrane;
said plurality of areas of said corresponding membrane comprises a plurality of elements;
said plurality of elements being disposed about the axis of rotation of said corresponding membrane;
said at least one vibration generator comprises a plurality of vibration generators;
each of said plurality of vibration generators is disposed to vibrate a corresponding one of said plurality of elements;
each of said means for non-rotationally attaching said first and second membranes comprises item E);
said means for generating a standing wave comprises means for generating a lock-up engagement for the rigid transmission of torque between said first and second members; and
said starter further comprising:
  additional displacement means for the generation of at least one axial displacement of at least one of: said first membrane element and said second membrane;
  said additional displacement means comprises means for generating at least one axial displacement which moves in a circle in the circumferential direction, whereby the relative speed of rotation of the at least one displacement maximum of said first membrane, with respect to the at least one displacement maximum of said second membrane, is substantially different from zero in a stationary coordinate system.

18. A torque transmission device, said torque transmission device comprising:
a first member;
said first member comprising a portion;
a second member;
one of: said first member and said second member comprising means for non-rotational connection to a first element to rotate therewith;
said second member being disposed adjacent to said first member;
means for engaging said first member and said second member to transmit torque; and
said means for engaging said first member and said second member to transmit torque comprising:
  said portion of said first member;
  said portion of said first member comprising a membrane; and
  means for deforming said membrane to engage said membrane with said second member.

19. The torque transmission device according to claim 18, wherein:
said torque transmission device comprises an axis of rotation;
said membrane is disposed substantially perpendicular to the axis of rotation;
said means for deforming said membrane to engage said membrane with said second member comprises means for displacing at least a portion of said membrane towards said second member to engage said membrane with said second member;
the displacement of said at least a portion of said membrane is substantially parallel to the axis of rotations;
said at least a portion of said membrane comprises a plurality of regions;
said plurality of regions are disposed about the axis of rotation;
said plurality of regions comprises at least one first region;
said means for displacing at least a portion of said membrane towards said second member comprises means for displacing said at least one first region a substantially greater distance towards said second member than the other of said plurality of regions towards said second member;
said membrane of said first member is a first membrane;
said second member comprises a portion;
said means for engaging said first member and said second member further comprises:
  said portion of said second member;
  said portion of said second member comprises a second membrane;
  said second membrane is disposed substantially perpendicular to the axis of rotation; and
  said second membrane is disposed adjacent to said first membrane;
said means for deforming said membrane to engage said membrane with said second member is disposed to engage said at least one first region of said first membrane with said second membrane;
said means for engaging said first member and said second member further comprises means for deforming said second membrane to engage said second membrane with said first membrane;
said means for deforming said second membrane to engage said second membrane with said first membrane comprises means for displacing at least a portion of said second membrane towards said first membrane to engage said portion of said second membrane with said first membrane;
said portion of said second membrane comprises a plurality of regions;
said plurality of regions of said second membrane is disposed about the axis of rotation;

said plurality of regions of said second membrane comprises at least one first region;

said means for displacing at least a portion of said second membrane towards said first membrane comprises means for displacing said at least one first region of said second membrane a substantially greater distance towards said first membrane than the other of said plurality of regions of said second membrane towards said first membrane;

said means for displacing said at least one first region towards said second member is a first displacement means;

said means for displacing said at least one first region of said second membrane towards said first membrane is a second displacement means;

at least one of: said first displacement means and said second displacement means comprises one of the following A), B) and C):
A) piezoelectric means,
B) electromagnetic means; and
C) the corresponding one of: said first membrane and said second membrane disposed adjacent to said at least one of: said first displacement means and said second displacement means;

said first member comprises a first membrane carrier;

said first membrane carrier is disposed concentrically about the axis of transmission of said torque transmission device;

said torque transmission device comprises means for non-rotationally attaching said first membrane to said first membrane carrier;

said second member comprises a second membrane carrier;

said second membrane carrier is disposed concentrically about the axis of rotation of said torque transmission device, said torque rotation device comprises means for non-rotationally attaching said second membrane to said second membrane carrier; and each of said means for non-rotationally attaching said first and second membranes comprises one of the following D) and E):
D) said first membrane comprises an outer portion;
said outer portion of said first membrane is disposed at the radial periphery of said first membrane;
said outer portion of said first membrane is attached to said first membrane carrier,
said second membrane comprises an outer portion,
said outer portion of said second membrane is disposed at the radial periphery of said second membrane; and
said outer portion of said second membrane is attached to said second membrane carrier;
E) said second membrane comprises an inner portion;
said inner portion of said first membrane is disposed about an inner radial periphery of said first membrane;
said inner portion of said first membrane is attached to said first membrane carrier;
said second membrane comprises an inner portion;
said inner portion of said second membrane is disposed about an inner radial periphery of said second membrane; and
said inner portion of said second membrane is attached to said second membrane carrier.

20. The torque transmission device according to claim 19, wherein:

said at least one of: said first displacement means and said second displacement means comprises C), said corresponding one of: said first membrane and said second membrane represents a corresponding membrane;

said corresponding membrane comprises an axis of rotation;

said at least one of: said first displacement means and said second displacement means comprises means for interacting with said corresponding membrane;

said means for interacting with said corresponding membrane comprises:
at least one area of said plurality of regions of said corresponding membrane; and
said at least one area of said plurality of regions of said corresponding membrane comprises at least one of:
F) means for modifying an electrostatic charge disposed on said at least one area; and
G) means for modifying a magnetic polarization of said at least one area;

said at least one area comprises a plurality of said areas;

said plurality of said areas is disposed about the axis of rotation of said corresponding membrane;

each of said plurality of areas is disposed adjacent to another one of said plurality of areas;

said plurality of areas is disposed to subtend an angle of substantially 360 degrees about the axis of rotation of said corresponding membrane;

said means for interacting with said corresponding membrane comprises means for generating a natural vibration of said corresponding membrane;

said means for generating a natural vibration of said corresponding membrane comprises at least one vibration generator;

said at least one vibration generator comprises means for generating a standing wave in said plurality of areas of said corresponding membrane;

said standing wave generated in said plurality of areas of said corresponding membrane is a whole-number multiple of a natural frequency of said other membrane;

said plurality of areas of said corresponding membrane comprises a plurality of elements;

said plurality of elements being disposed about the axis of rotation of said corresponding membrane;

said at least one vibration generator comprises a plurality of vibration generators;

each of said plurality of vibration generators is disposed to vibrate a corresponding one of said plurality of elements;

each of said means for non-rotationally attaching said first and second membranes comprises item E);

said means for generating a standing wave comprises means for generating a lock-up engagement for the rigid transmission torque between said first and second members; and said torque transmission device further comprises one of the following H) and I):
I) means for isolating vibrations from said torque transmission device;
said means for isolating vibrations from said torque transmission device comprising:

additional displacement means for the generation of at least one axial displacement of at least one of: said first membrane and said second membrane;

means for the measurement of a vibration excitation of at least one of: said first member and said second member;

means for the control of the at least one axial displacement of said at least one of: said first membrane and said second membrane to prevent transmittal of the vibrational excitation of said at least one of: said first member and said second member is not transmitted to the other of said first member and said second member;

said additional displacement means for the generation of at least one axial displacement of at least one of: said first membrane and said second membrane comprises means for generating at least one displacement which moves in a circle in the circumferential direction; and said means for the control of the at least one axial displacement comprises:

means for generating, in the circumferential direction, an oscillating displacement maximum of said at least one of: said first membrane and said second membrane, with respect to a stationary coordinate system, whereby the rotational velocity of the at least one displacement maximum of said at least one: first membrane and said second membrane essentially equals the rotational velocity of the at least one displacement maximum of the other of: said first membrane and said second membrane; and means for varying the amplitude of the at least one displacement maximum of said at least one of: said first membrane and said second membrane;

J) additional displacement means for generating at least one axial displacement of at least one of: said first membrane and said second membrane; and said additional displacement means comprising means for generating at least one displacement which moves in a circle in the circumferential direction, whereby the relative rotational velocity of the at least one displacement maximum of said first membrane with respect to the at least one displacement maximum of said second membrane in a stationary coordinate system is substantially different from zero.

\* \* \* \* \*

UNITED STATES PATENT AND TRADEMARK OFFICE
CERTIFICATE OF CORRECTION

PATENT NO. : 5,678,672                                    Page 1 of 2
DATED      : October 21, 1997
INVENTOR(S): Jörg SUDAU It is certified that error appears in the above-identified patent and that said Letters Patent is hereby corrected as shown below:

In column 1, line 18, after 'devices,', delete "hereby" and insert --whereby--.

In column 12, line 36, after '132', delete "end" and insert --and--.

In column 19, line 62, after '414', delete "(end" and insert --(and--.

In column 20, line 19, after 'arrangement' insert --500--.

In column 21, line 30, after 'displacement', delete "maxima," and insert --maximum,--.

In column 23, line 39, before 'a' delete "of".

In column 29, lines 14-15, Claim 11, before 'and', delete "membranes;" and insert --membrane;--.

UNITED STATES PATENT AND TRADEMARK OFFICE
CERTIFICATE OF CORRECTION

PATENT NO. : 5,678,672
DATED : October 21, 1997
INVENTOR(S) : Jörg SUDAU

It is certified that error appears in the above-identified patent and that said Letters Patent is hereby corrected as shown below:

In column 30, line 57, Claim 15, after 'means', delete "for-non-rotational" and insert --for non-rotational--.

In addition, in column 34, line 25, Claim 19, after 'of', delete "rotations;" and insert --rotation;--.

In column 35, line 28, Claim 19, after the first occurrence of 'of', delete "transmission" and insert --rotation--.

In column 35, line 39, Claim 19, after 'torque', delete "rotation" and insert --transmission--.

In column 36, line 60, Claim 20, after 'transmission' insert --of--.

Signed and Sealed this

Fifth Day of May, 1998

BRUCE LEHMAN

*Attest:*

*Attesting Officer*  *Commissioner of Patents and Trademarks*